(12) United States Patent
Wan et al.

(10) Patent No.: US 12,147,372 B2
(45) Date of Patent: Nov. 19, 2024

(54) PCIE-BASED DATA TRANSMISSION METHOD AND APPARATUS

(71) Applicant: HUAWEI TECHNOLOGIES CO., LTD., Guangdong (CN)

(72) Inventors: Lei Wan, Beijing (CN); Pengxin Bao, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/870,535

(22) Filed: Jul. 21, 2022

(65) Prior Publication Data

US 2022/0358075 A1 Nov. 10, 2022

Related U.S. Application Data

(63) Continuation of application No. PCT/CN2020/073925, filed on Jan. 22, 2020.

(51) Int. Cl.
*G06F 13/42* (2006.01)
*H04L 45/74* (2022.01)

(52) U.S. Cl.
CPC .......... *G06F 13/4221* (2013.01); *H04L 45/74* (2013.01); *G06F 2213/0026* (2013.01)

(58) Field of Classification Search
CPC ..... H04L 69/22; H04L 45/74; G06F 13/4282; G06F 3/4208; G06F 13/4221; G06F 13/4208
See application file for complete search history.

(56) References Cited

U.S. PATENT DOCUMENTS

| 5,473,691 A | 12/1995 | Menezes et al. |
| 8,139,575 B2 | 3/2012 | Biran et al. |
| 9,280,290 B2 | 3/2016 | Feehrer et al. |
| 10,423,552 B2 | 9/2019 | Harriman |

(Continued)

FOREIGN PATENT DOCUMENTS

| CN | 1608255 A | 4/2005 |
| CN | 1608256 A | 4/2005 |

(Continued)

OTHER PUBLICATIONS

Wagh, "PCIe 3.0/2.1 Protocol Update," PCIe Technical Seminar, Dec. 31, 2011, 35 pages.

(Continued)

*Primary Examiner* — Phong H Dang
(74) *Attorney, Agent, or Firm* — Fish & Richardson P.C.

(57) ABSTRACT

This application discloses a peripheral component interconnect express (PCIe)-based data transmission method and apparatus. The method includes: A first node encapsulates data into a transaction layer packet (TLP) and then sends the TLP to a second node. The TLP includes a packet header and an extension header. The packet header includes a first field and a second field. The first field, the second field, and the extension header are used to indicate first encapsulation information. The first encapsulation information includes a data type of the data and at least one encapsulation parameter corresponding to the data type. In some embodiments, the first field, the second field, and the extension header are used to indicate the information required for transmitting the data.

17 Claims, 13 Drawing Sheets

(56) References Cited

U.S. PATENT DOCUMENTS

| | | | |
|---|---|---|---|
| 2003/0163303 A1* | 8/2003 | Du | H04S 3/008 |
| | | | 704/201 |
| 2005/0238038 A1 | 10/2005 | Keller et al. | |
| 2006/0153078 A1 | 7/2006 | Yasui | |
| 2006/0161707 A1 | 7/2006 | Davies et al. | |
| 2007/0147426 A1 | 6/2007 | Sharma et al. | |
| 2007/0168644 A1 | 7/2007 | Hummel et al. | |
| 2009/0006711 A1* | 1/2009 | Biran | G06F 13/4282 |
| | | | 710/316 |
| 2009/0006932 A1* | 1/2009 | Biran | G06F 13/4282 |
| | | | 714/E11.032 |
| 2009/0296740 A1* | 12/2009 | Wagh | H04L 69/22 |
| | | | 370/475 |
| 2012/0188882 A1* | 7/2012 | Wilkinson | H04N 21/6473 |
| | | | 370/252 |
| 2014/0181354 A1 | 6/2014 | Yi et al. | |
| 2014/0281104 A1 | 9/2014 | Raskin | |
| 2014/0372660 A1 | 12/2014 | Jones et al. | |
| 2015/0227312 A1 | 8/2015 | Feehrer et al. | |
| 2016/0041936 A1 | 2/2016 | Lee et al. | |
| 2017/0220494 A1 | 8/2017 | Shacham et al. | |
| 2018/0101498 A1 | 4/2018 | Cosby et al. | |
| 2018/0234525 A1* | 8/2018 | Deshpande | H04L 47/36 |
| 2018/0307648 A1 | 10/2018 | Shakamuri et al. | |
| 2019/0108156 A1 | 4/2019 | Lee et al. | |
| 2020/0226091 A1* | 7/2020 | Harriman | G06F 13/4282 |

FOREIGN PATENT DOCUMENTS

| | | | |
|---|---|---|---|
| CN | 1953461 A | 4/2007 | |
| CN | 101594306 A | 12/2009 | |
| CN | 101681325 A | 3/2010 | |
| CN | 102821082 A | 12/2012 | |
| CN | 103003808 A | 3/2013 | |
| CN | 103023824 A | 4/2013 | |
| CN | 103117929 A | 5/2013 | |
| CN | 103490852 A | 1/2014 | |
| CN | 103532807 A | 1/2014 | |
| CN | 103701680 A | 4/2014 | |
| CN | 105185414 A | 12/2015 | |
| CN | 105205021 A | 12/2015 | |
| CN | 105335227 A | 2/2016 | |
| CN | 105653481 A | 6/2016 | |
| CN | 107656884 A | 2/2018 | |
| CN | 107771325 A | 3/2018 | |
| CN | 110389711 A | 10/2019 | |
| CN | 113498600 A | 10/2021 | |
| EP | 3311295 B1 | 12/2019 | |
| WO | 2015016882 A1 | 2/2015 | |

OTHER PUBLICATIONS

PCI-SIG, "PCI Express Base Specification Revision 5.0; Version 1.0," May 22, 2019, 1299 pages.
Awley, "Understanding Performance of PCI Express Systems," White Paper: UltraScale and Virtex-7 FPGAs, WP350 (v1.2), Oct. 28, 2014, 16 pages.
Qiu et al., "Microcomputer Principles and Interface Technology (Third Edition)," Xidian University Press, Jun. 2016, 10 pages (with English abstract).
Dong et al., "Design of High Speed Image Transmission System Based on Double DMA Buffer," Chinese Journal of Electron Devices, vol. 41, No. 6, Dec. 2018, 8 pages (with English machine translation).
Office Action in Chinese Appln. No. 202080003143.1, dated Feb. 7, 2022, 19 pages (with English translation).
Extended European Search Report in European Appln No. 20915035.8, dated Dec. 2, 2022, 5 pages.
International Search Report and Written Opinion in International Appln. No. PCT/CN2020/073925, mailed on Oct. 28, 2020, 15 pages (with English translation).

* cited by examiner

PCIE-BASED DATA TRANSMISSION METHOD AND APPARATUS

CROSS-REFERENCE TO RELATED APPLICATIONS

This application is a continuation of International Application No. PCT/CN2020/073925, filed on Jan. 22, 2020, the disclosure of which is hereby incorporated by reference in its entirety.

TECHNICAL FIELD

This application relates to the field of communication technologies, and in particular, to a peripheral component interconnect express (peripheral component interconnect express, PCIe)-based data transmission method and apparatus.

BACKGROUND

PCIe is a high-speed short-distance communications interface widely applied to devices such as computers and test instruments. Main components in a PCIe system include a root (Root), a switch (Switch), and an endpoint (Endpoint). The root is responsible for managing all buses and nodes in the PCIe system, and is a bridge for communication between a central processing unit (central processing unit, CPU) and the endpoint in the PCIe system. The switch is used as a data forwarding node, and is connected to the switch and the endpoint. The endpoint is an end device, for example, a peripheral (Peripheral). The endpoints in the PCIe system need to communicate with each other through the root.

A mechanism in which the endpoints in the PCIe system need to communicate with each other through the root results in a plurality of transmission interfaces in an intra-vehicle network. Information exchange between the interfaces requires interface conversion. The conversion between different interfaces greatly increases complexity of the intra-vehicle network, especially in a high-speed communication scenario.

SUMMARY

This application provides a PCIe-based data transmission method and apparatus, so that endpoints in a PCIe system can communicate with each other without using a root, thereby reducing complexity of an intra-vehicle network.

According to a first aspect, an embodiment of this application provides a PCIe-based data transmission method, including: A first node encapsulates data into a transaction layer packet (transaction layer packet, TLP) and then sends the TLP to a second node. The TLP includes a packet header and an extension header. The packet header includes a first field and a second field, the first field, the second field, and the extension header are used to indicate first encapsulation information, and the first encapsulation information includes a data type of the data and at least one encapsulation parameter corresponding to the data type. In this embodiment of this application, the first field, the second field, and the extension header are used to indicate the information required for transmitting the data, such as the data type and the encapsulation parameter corresponding to the data type, so that endpoints can communicate with each other even if a root is not used, thereby reducing complexity of an intra-vehicle network.

In a possible design, a value of a bit set indicates the data type, and the bit set includes a bit in the first field and a bit in the second field. The extension header carries the at least one encapsulation parameter. In the foregoing design, the first field and the second field are jointly encoded, so that the TLP can indicate the information required for transmitting the data, and thus, the endpoints can communicate with each other even if the root is not used.

In a possible design, the first field indicates the data type, and the second field indicates a first parameter set. The extension header of the data packet carries a second parameter set. The first parameter set includes some encapsulation parameters of the at least one encapsulation parameter, and the second parameter set includes another encapsulation parameter, except the some encapsulation parameters, of the at least one encapsulation parameter. In the foregoing design, the first field and the second field are separately indicated, so that when parsing one of the fields, a destination endpoint can determine whether to use a solution provided in this application.

In a possible design, the first field is a type (Type) field, and the second field is a reserved bit. In the foregoing design, the type field and the reserved bit are reused, so that a change to a TLP structure is small.

In a possible design, the packet header further includes a third field. The third field carries second encapsulation information, and the second encapsulation information includes another encapsulation parameter, rather than the encapsulation parameter included in the first encapsulation information, of encapsulation parameters corresponding to the data type. Based on the foregoing design, the TLP can indicate more encapsulation information.

In a possible design, the third field is byte 4 to byte 15 or byte 4 to byte 11 of the packet header. Because the byte 4 to byte 15 or byte 4 to byte 11 of the packet header indicate different content based on different type fields, when the type field and the reserved bit are used to indicate the first encapsulation information, the third field may be used to carry some or all encapsulation parameters.

In a possible design, the data type includes at least one of the following: an image, audio, control information, stream write (stream write, SWRITE), and security.

In a possible design, encapsulation parameters corresponding to the image may include an image data type, a pixel bit quantization depth, resolution, and segment indication information.

In a possible design, encapsulation parameters corresponding to the audio may include a sampling quantization format, a sampling frequency, a quantization depth, and a quantity of channels/channels.

In a possible design, encapsulation parameters corresponding to the control information may include a type of the control information and a quantity of each type of control information.

In a possible design, encapsulation parameters corresponding to the security may include a message type, a format indication, and whether a message is encrypted.

In a possible design, an encapsulation parameter corresponding to the SWRITE may include an alignment mode.

In a possible design, the first field is a reserved value. In the foregoing design, the reserved value is used, so that a PCIe system can be compatible with an original data transmission method and the data transmission method provided in this application.

In a possible design, the TLP may carry information about the destination endpoint, such as an address of the destination endpoint and an identification (identification, ID) of the destination endpoint. Based on the foregoing design, the second node may determine a routing path based on the information about the destination endpoint, so that the second node may send the TLP to the destination endpoint according to the routing path without using the root.

According to a second aspect, an embodiment of this application provides a PCIe-based data transmission method, including: A second node receives a first TLP sent by a first node. The second node sends a second TLP to a third node. A TLP includes a packet header and an extension header. A first field of the packet header, a second field of the packet header, and the extension header are used to indicate first encapsulation information, and the first encapsulation information includes a data type of data carried in the TLP and at least one encapsulation parameter corresponding to the data type. The TLP includes the first TLP and/or the second TLP. In this embodiment of this application, the first field of the packet header, the second field of the packet header, and the extension header are used to indicate the information required for transmitting the data, such as the data type and the encapsulation information corresponding to the data type, so that endpoints can communicate with each other even if a root is not used, thereby reducing complexity of an intra-vehicle network.

In a possible design, the first TLP and the second TLP may be a same TLP, or the first TLP and the second TLP may be different TLPs.

In a possible design, the first TLP and the second TLP include same data, or data content included therein is the same.

In a possible design, a value of a bit set indicates the data type, and the bit set includes a bit in the first field and a bit in the second field. The extension header carries the at least one encapsulation parameter. In the foregoing design, the first field and the second field are jointly encoded, so that the TLP can indicate the information required for transmitting the data, and thus, the endpoints can communicate with each other even if the root is not used.

In a possible design, the first field indicates the data type, and the second field indicates a first parameter set. The extension header of the data packet carries a second parameter set. The first parameter set includes some encapsulation parameters of the at least one encapsulation parameter, and the second parameter set includes another encapsulation parameter, except the some encapsulation parameters, of the at least one encapsulation parameter. In the foregoing design, the first field and the second field are separately indicated, so that when parsing one of the fields, the third node can determine whether to use a solution provided in this application.

In a possible design, the first field is a type field, and the second field is a reserved bit. In the foregoing design, the type field and the reserved bit are reused, so that a change to a TLP structure is small.

In a possible design, the packet header further includes a third field. The third field carries second encapsulation information, and the second encapsulation information includes another encapsulation parameter, rather than the encapsulation parameter included in the first encapsulation information, of encapsulation parameters corresponding to the data type. Based on the foregoing design, the TLP can indicate more encapsulation information.

In a possible design, the third field is byte 4 to byte 15 or byte 4 to byte 11 of the packet header. Because the byte 4 to byte 15 or byte 4 to byte 11 of the packet header indicate different content based on different type fields, when the type field and the reserved bit are used to indicate the first encapsulation information, the third field may be used to carry some or all encapsulation parameters.

In a possible design, the data type includes at least one of the following: an image, audio, control information, SWRITE, and security.

In a possible design, encapsulation parameters corresponding to the image may include an image data type, a pixel bit quantization depth, resolution, and segment indication information.

In a possible design, encapsulation parameters corresponding to the audio may include a sampling quantization format, a sampling frequency, a quantization depth, and a quantity of channels/channels.

In a possible design, encapsulation parameters corresponding to the control information may include a type of the control information and a quantity of each type of control information.

In a possible design, encapsulation parameters corresponding to the security may include a message type, a format indication, and whether a message is encrypted.

In a possible design, an encapsulation parameter corresponding to the SWRITE may include an alignment mode.

In a possible design, the first field is a reserved value. In the foregoing design, the reserved value is used, so that a PCIe system can be compatible with an original data transmission method and the data transmission method provided in this application.

In a possible design, the first TLP may carry identity information of the third node, for example, an address of the third node or an ID of the third node. Based on the foregoing design, the second node may determine a routing path based on the information about the third node, so that the second node may send the first TLP to the third node according to the routing path without using the root.

In a possible design, before the second node sends the second TLP to the third node, the second node may select a routing path based on identity information of the third node. That the second node sends the second TLP to the third node includes: The second node sends the second TLP to the third node according to the routing path. Based on the foregoing design, the second node may determine a routing path based on the information about the third node, so that the second node may send the first TLP to the third node according to the routing path without using the root.

According to a third aspect, an embodiment of this application provides a PCIe-based data receiving method, including: A third node receives a TLP sent by a second node, where the TLP includes a packet header and an extension header, the packet header includes a first field and a second field, the first field, the second field, and the extension header are used to indicate first encapsulation information, and the first encapsulation information includes a data type of data carried in the TLP and at least one encapsulation parameter corresponding to the data type. The third node obtains, from the TLP, the data based on the first encapsulation information. In this embodiment of this application, the first field, the second field, and the extension header are used to indicate the information required for transmitting the data, such as the data type and the encapsulation information corresponding to the data type, so that endpoints can communicate with each other even if a root is not used, thereby reducing complexity of an intra-vehicle network.

In a possible design, a value of a bit set indicates the data type, and the bit set includes a bit in the first field and a bit in the second field. The extension header carries the at least one encapsulation parameter. In the foregoing design, the first field and the second field are jointly encoded, so that the TLP can indicate the information required for transmitting the data, and thus, the endpoints can communicate with each other even if the root is not used.

In a possible design, the first field indicates the data type, and the second field indicates a first parameter set. The extension header of the data packet carries a second parameter set. The first parameter set includes some encapsulation parameters of the at least one encapsulation parameter, and the second parameter set includes another encapsulation parameter, except the some encapsulation parameters, of the at least one encapsulation parameter. In the foregoing design, the first field and the second field are separately indicated, so that when parsing one of the fields, the third node can determine whether to use a solution provided in this application.

In a possible design, the first field is a type field, and the second field is a reserved bit. In the foregoing design, the type field and the reserved bit are reused, so that a change to a TLP structure is small.

In a possible design, the data type includes at least one of the following: an image, audio, control information, SWRITE, and security.

In a possible design, encapsulation parameters corresponding to the image may include an image data type, a pixel bit quantization depth, resolution, and segment indication information.

In a possible design, encapsulation parameters corresponding to the audio may include a sampling quantization format, a sampling frequency, a quantization depth, and a quantity of channels/channels.

In a possible design, encapsulation parameters corresponding to the control information may include a type of the control information and a quantity of each type of control information.

In a possible design, encapsulation parameters corresponding to the security may include a message type, a format indication, and whether a message is encrypted.

In a possible design, an encapsulation parameter corresponding to the SWRITE may include an alignment mode.

In a possible design, the first field is a reserved value. In the foregoing design, the reserved value is used, so that a PCIe system can be compatible with an original data transmission method and the data transmission method provided in this application.

In a possible design, when obtaining, from the TLP, the data based on the first encapsulation information, the third node may determine a format of the data based on the first encapsulation information, and obtain the data based on the format. Based on the foregoing design, the third node may parse the TLP header to obtain a type and a format of the image, to obtain the data.

In a possible design, the packet header further includes a third field. The third field carries second encapsulation information, and the second encapsulation information includes another encapsulation parameter, rather than the encapsulation parameter included in the first encapsulation information, of encapsulation parameters corresponding to the data type. Based on the foregoing design, the TLP can indicate more encapsulation information.

In a possible design, the third field is byte 4 to byte 15 or byte 4 to byte 11 of the packet header. Because the byte 4 to byte 15 or byte 4 to byte 11 of the packet header indicate different content based on different type fields, when the type field and the reserved bit are used to indicate the first encapsulation information, the third field may be used to carry some or all encapsulation parameters.

In a possible design, when obtaining the data based on the first encapsulation information, the third node may determine a format of the data based on the first encapsulation information and the second encapsulation information, and obtain the data based on the format. Based on the foregoing design, the third node may parse the TLP header to obtain the type and the format of the image, to obtain the data.

According to a fourth aspect, this application provides a PCIe-based data transmission apparatus. The apparatus may be a communications device, or may be a chip or a chip group in a communications device. The communications device may be a first node, a second node, or a third node. The apparatus may include a processing unit and a transceiver unit. When the apparatus is the communications device, the processing unit may be a processor, and the transceiver unit may be a transceiver. The apparatus may further include a storage module, and the storage module may be a memory. The storage module is configured to store instructions, and the processing unit executes the instructions stored in the storage module, so that the first node performs a corresponding function in the first aspect; the processing unit executes the instructions stored in the storage module, so that the second node performs a corresponding function in the second aspect; or the processing unit executes the instructions stored in the storage module, so that the third node performs a corresponding function in the third aspect. When the apparatus is the chip or the chipset in the communications device, the processing unit may be a processor, and the transceiver unit may be an input/output interface, a pin, a circuit, or the like. The processing unit executes instructions stored in a storage module, so that the first node performs a corresponding function in the first aspect; the processing unit executes instructions stored in a storage module, so that the second node performs a corresponding function in the second aspect; or the processing unit executes instructions stored in a storage module, so that the third node performs a corresponding function in the third aspect. The storage module may be a storage module (for example, a register or a cache) in the chip or the chipset, or may be a storage module (for example, a read-only memory or a random access memory) that is in a network device and that is located outside the chip or the chipset.

According to a fifth aspect, a PCIe-based data transmission apparatus is provided. The apparatus includes a processor, and may further include a communications interface and a memory. The communications interface is used to transmit information, a message, and/or data between the apparatus and another apparatus. The memory is configured to store computer-executable instructions. When the apparatus runs, the processor executes the computer-executable instructions stored in the memory, to enable the apparatus to perform the data transmission method according to the first aspect or any one of the designs of the first aspect, the second aspect or any one of the designs of the second aspect, or the third aspect or any one of the designs of the third aspect.

According to a sixth aspect, this application further provides a computer-readable storage medium. The computer-readable storage medium stores instructions. When the instructions are run on a computer, the computer is enabled to perform the data transmission method according to the first aspect or any one of the designs of the first aspect, the second aspect or any one of the designs of the second aspect, or the third aspect or any one of the designs of the third aspect.

According to a seventh aspect, this application further provides a computer program product including instructions.

When the computer program product runs on a computer, the computer is enabled to perform the data transmission method according to the first aspect or any one of the designs of the first aspect, the second aspect or any one of the designs of the second aspect, or the third aspect or any one of the designs of the third aspect.

According to an eighth aspect, this application further provides a PCIe system. The system includes a first node, a second node, and a third node. The first node may perform a corresponding function in the first aspect, the second node may perform a corresponding function in the second aspect, and the third node may perform a corresponding function in the third aspect.

According to a ninth aspect, an embodiment of this application provides a chip. The chip includes at least one processor and a communications interface. The processor is coupled to a memory, and is configured to read computer programs stored in the memory, to perform the data transmission method according to the first aspect or any one of the designs of the first aspect, the second aspect or any one of the designs of the second aspect, or the third aspect or any one of the designs of the third aspect of embodiments of this application.

According to a tenth aspect, an embodiment of this application provides a chip, including a communications interface and at least one processor. The processor runs to perform the data transmission method according to the first aspect or any one of the designs of the first aspect, the second aspect or any one of the designs of the second aspect, or the third aspect or any one of the designs of the third aspect of embodiments of this application.

It should be noted that "coupling" in embodiments of this application indicates a direct combination or an indirect combination of two components.

DESCRIPTION OF EMBODIMENTS

PCIe is a high-speed short-distance communications interface widely applied to devices such as computers and test instruments. Currently, because the PCIe can quickly and directly read data from and write data into a memory and provide high-bandwidth communication, some automobile enterprises extend a transmission distance of the PCIe and use the PCIe as a communications port for a large amount of data in an intra-vehicle network. However, due to a limitation of a PCIe working mechanism, the PCIe is not fully applicable to all scenarios in the intra-vehicle network.

Figure 1:
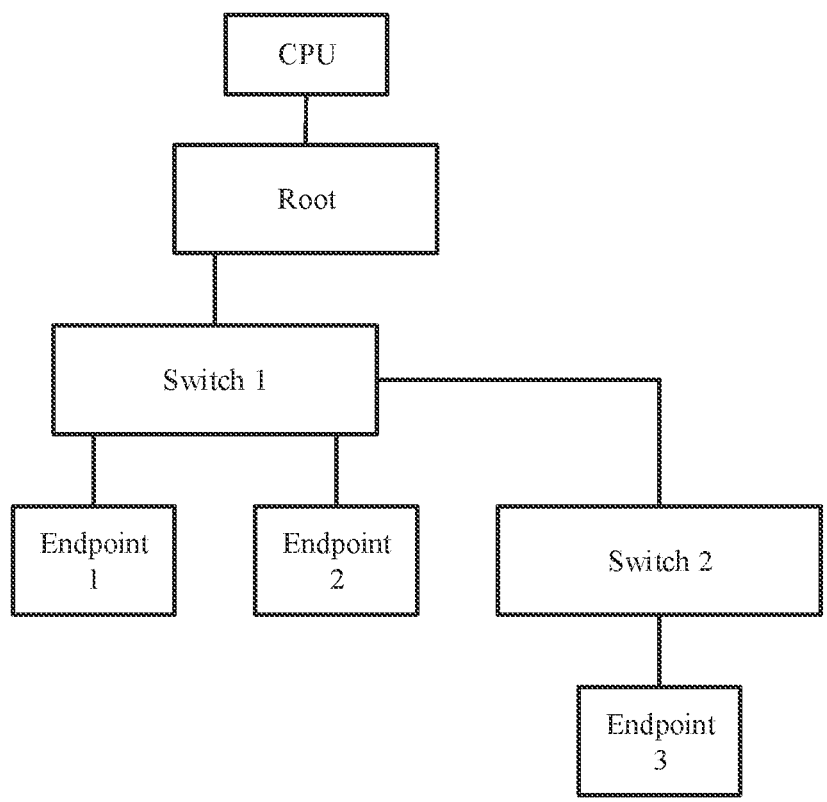
FIG. 1 is a schematic diagram of an architecture of a PCIe system according to an embodiment of this application.

FIG. 1 shows a PCIe system. Main components of the system include a root (a root shown in FIG. 1), a switch (a switch shown in FIG. 1), and an endpoint (an endpoint shown in FIG. 1). The root is responsible for managing all buses (shown by black lines in FIG. 1) and nodes in the PCIe system, and is a bridge for communication between a CPU and another device in the system. The CPU communicates with all devices through the root. The switch functions as a bridge to connect the root, another switch, and the endpoint, and functions as a data forwarding node. The endpoint is an end device, for example, a peripheral (peripheral), and is responsible for sending or receiving data.

Figure 2:
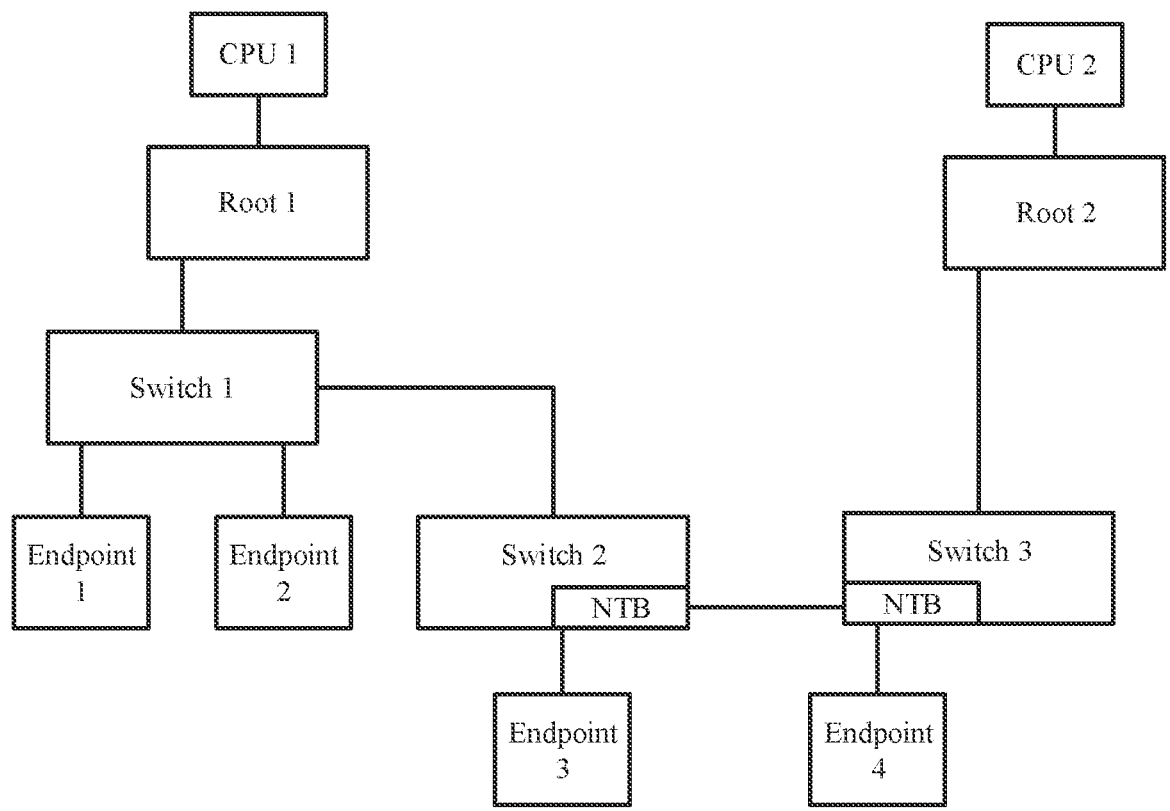
FIG. 2 is a schematic diagram of an architecture of another PCIe system according to an embodiment of this application.

FIG. 2 shows a communications system including two PCIe systems. The two PCIe systems may communicate with each other through a non-transparent bridge (non-transparent bridge, NTB). The NTB can be deployed on a switch. Because each device in a PCIe system is independently managed by its own root, addresses and IDs of devices in different PCIe systems may conflict with each other. To ensure that the two systems are connected and communicate with each other normally, bridging translation needs to be performed between the two systems to translate addresses or IDs. The NTB may be responsible for address or ID translation, so that the two PCIe systems communicate with each other.

In the PCIe system, endpoints need to communicate with each other through the root, because only the root knows functions of the endpoints and types of data supported by the endpoints. Information of the functions of the endpoints in the PCIe system, such as the supported data types and formats, is stored in endpoint configuration space. Only the root has permission to read the endpoint configuration space. Other endpoints and switches do not have permission to read the endpoint configuration space. Therefore, only the root knows the information about the data types and format supported by the endpoints, and other nodes cannot obtain the information. However, the endpoint in the PCIe system does not know a data type and a format supported by another endpoint, and cannot perform communication without using the root.

In FIG. 1, although an endpoint 1 and an endpoint 2 are connected to a same switch, the endpoint 1 and the endpoint 2 cannot directly communicate with each other through the switch. The endpoint 1/2 needs to first communicate with the root, and then find the endpoint 2/1 through the root. For example, a process in which the endpoint 1 sends data to the endpoint 2 is as follows: The endpoint 1 sends the data to a switch 1; the switch 1 sends the data to the root; the root determines, based on a function of each endpoint, that a data receiver is the endpoint 2; the root sends the data to the switch 1; and the switch 1 sends the data to the endpoint 2.

A mechanism in which the endpoints in the PCIe system communicate with each other through the root is not applicable to many scenarios in the intra-vehicle network. For example, a ring intra-vehicle network requires that a sensor should be directly connected to a gateway, and data of the sensor should be switched and forwarded to different computing/display units through the gateway/a switch on the ring intra-vehicle network. Such intra-vehicle network architecture requires that the data of the sensor should be forwarded to any direction through the gateway/switch to provide communication link redundancy and ensure communication security in a vehicle. Therefore, the ring intra-vehicle network needs to use another interface. In this case, there are a plurality of transmission interfaces in the intra-vehicle network, and interface conversion is required for information exchange between the interfaces. Conversion between different interfaces greatly increases complexity of the intra-vehicle network.

Based on this, embodiments of this application provide a PCIe-based data transmission method and apparatus, to resolve a problem in the conventional technology that there are the plurality of transmission interfaces in the intra-vehicle network and the complexity of the intra-vehicle network is high due to the mechanism in which the endpoints communicate with each other through the root. The method and apparatus are based on a same inventive concept. Because the method and the device have a similar problem-resolving principle, for implementations of the apparatus and the method, refer to each other, and no repeated description is provided. The PCIe-based data transmission method and apparatus provided in embodiments of this application may be applied to an intra-vehicle network, especially an intra-vehicle network of an autonomous vehicle, or may be applied to a PCIe system of another device.

To facilitate understanding of embodiments of this application, the following describes a structure of a TLP in the PCIe Base Specification Revision 5.0 Version 1.0 (PCI Express Base Specification Revision 5.0 Version 1.0).

Figure 3:
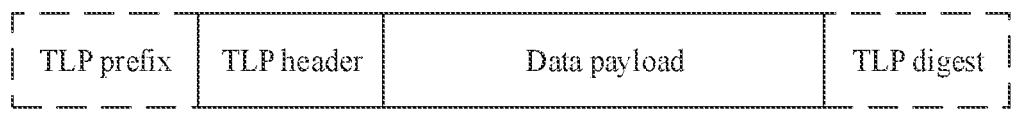
FIG. 3 is a schematic diagram of a structure of a TLP according to an embodiment of this application.

The structure of the TLP may be shown in FIG. 3, and may include a TLP prefix (TLP Prefix), a TLP header (TLP Header), a data payload (Data Payload), and a TLP digest (TLP Digest). A length of the TLP prefix may be H bytes (Bytes), and H is an integer greater than 0. A length of the TLP header may be 12/16 bytes, and is used to indicate a PCIe service type. The data payload is a data part, and may be 0 to 4K bytes in length. A length of the TLP digest may be four bytes, and indicated content may be a cyclic redundancy check (end-to-end 32 bit cyclic redundancy check, ECRC). For example, the ECRC may be a cyclic redundancy check (cyclic redundancy check, CRC), and is used to check whether data packet transmission is correct.

Figure 4:
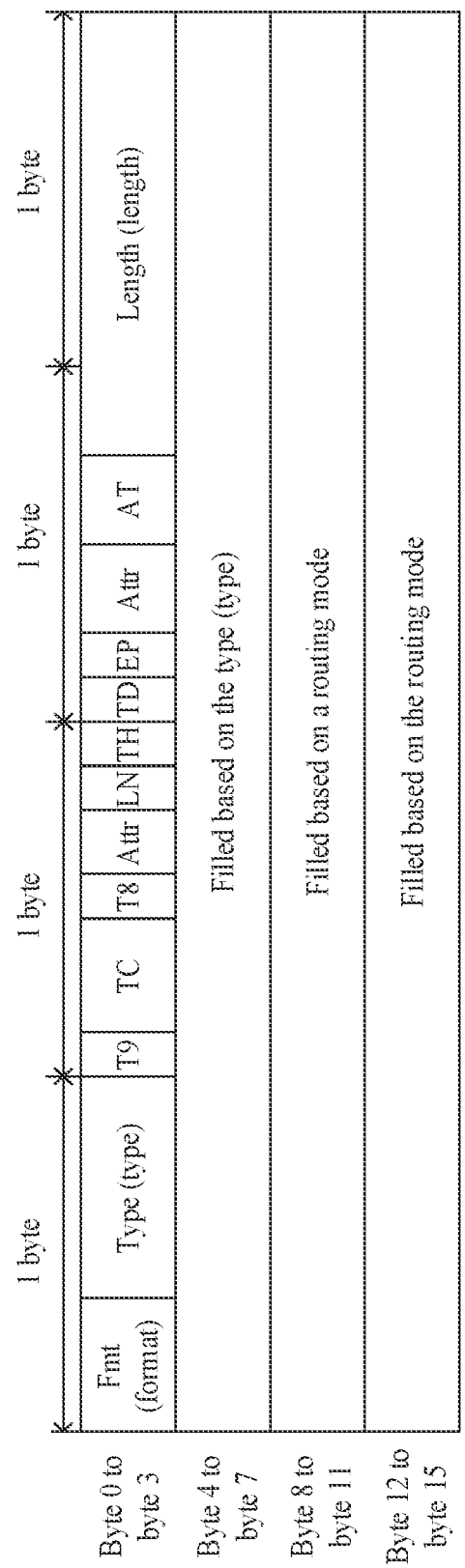
FIG. 4 is a schematic diagram of a structure of a TLP header according to an embodiment of this application.

A 16-byte TLP header is used as an example. A structure of the TLP header may be shown in FIG. 4, and the TLP header includes the following content.

Format (format, Fmt) field: A length of the field may be three bits (bit), and the field is used to indicate a length of the TLP header and whether the TLP includes a data payload part. The length of the TLP header may be of two types, and whether the TLP includes the data payload may be two cases: yes and no. Therefore, the Fmt field may indicate four types of information: The length of the TLP header is a first length and the TLP includes the data payload, the length of the TLP header is a first length and the TLP does not include the data payload; the length of the TLP header is a second length and the TLP includes the data payload; or the length of the TLP header is a second length and the TLP does not include the data payload. In addition, the Fmt field may further indicate the TLP prefix (Prefix). The Fmt field includes three bits and eight state values in total, where five of the eight state values may be used to indicate the foregoing five types of information, and remaining three state values are reserved (reserve). For example, five state values 000, 001, 010, 011, and 100 may be used to indicate the foregoing five types of information, and remaining three state values 101, 110, and 111 are reserved (reserve).

Type (Type) field: The type field includes five bits, and is used to indicate service types of the TLP. There are six types of PCIe services: memory (Memory) read/write, input/output (input/output, I/O) read/write, configuration (Configuration) read/write, message (Message) request, completion (Completion), and an atomic operation. The type field includes the five bits and 32 state values in total. In the PCI Express Base Specification Revision 5.0 Version 1.0, 19 state values are used to indicate the service types of the TLP, and remaining 13 state values are reserved. For example, 00000, 00001, 00010, 00100, 00101, 11011, 10000 to 10111, 01010, 01011, 01100, 01101 and 01110 may be used to indicate the service types of the TLP, and remaining 13 state values 00011, 00110, 00111, 01000, 01001, 01111, 11000 to 11010 and 11100 to 11111 are reserved.

T9/T8: reserved bit.

Priority (traffic class, TC) field: The priority field is used to indicate a scheduling priority.

Attribute (attribute, Attr) field: The attribute field is used to indicate a TLP attribute. The TLP attribute may refer to a TLP processing manner, for example, ordering (Ordering) processing or hardware coherency management (hardware coherency management (snoop)).

Lightweight notification (lightweight notification, LN) field: Lightweight notification is a simple read/write manner defined by the PCIe.

TLP processing hints (TLP processing hints, TH) field: The TLP processing hints field is used to indicate whether there are PHs (Processing Hints) at a tail of the TLP header.

TLP digest indication (indicates presence of TLP Digest, TD) field: The TLP digest indication field is used to indicate whether a tail of the TLP includes the TLP digest.

Poisoned data (poisoned data, EP): The poisoned data is used to indicate whether the TLP is poisoned data.

Address type (address type, AT): The address type is used to indicate whether an address needs to be translated.

Length (Length): The length is used to indicate a data payload length, and may use four bytes as a minimum unit.

Byte 4 to byte 7: The byte 4 to byte 7 are defined based on a service type, namely, based on a service type indicated by the type field, and the byte 4 to byte 7 may indicate content corresponding to the service type.

Byte 8 to byte 15: The byte 8 to byte 15 are filled with an address or an ID based on different routing modes and different content. The byte 8 to byte 11 may be filled with an address of a destination node or an ID of the destination node, and byte 12 to byte 15 may be filled with an address of a source node or an ID of the source node. Alternatively, the byte 8 to byte 11 may be filled with an address of a source node or an ID of the source node, and byte 12 to byte 15 may be filled with an address of a destination node or an ID of the destination node.

It may be understood that a structure of a 12-byte TLP header is similar to the structure type of the 16-byte TLP header, and a difference lies in that, in the 16-byte TLP header, the byte 4 to byte 7 are defined based on the service type, and the byte 8 to byte 15 are filled with address information, while in the 12-byte TLP header, byte 4 to byte 7 are defined based on a service type, and byte 8 to byte 11 are filled with address information.

The method provided in embodiments of this application is based on the TLP structure disclosed in the PCI Express Base Specification Revision 5.0 Version 1.0. A "reserved value" in embodiments of this application may be an unused state value in the PCI Express Base Specification Revision 5.0 Version 1.0, for example, the three state values 101, 110, and 111 in the Fmt field. The "reserved value" may also be referred to as a "reserve value". A "reserved bit" in embodiments of this application may refer to a bit that is not used in the TLP in the PCI Express Base Specification Revision 5.0 Version 1.0, for example, T8/T9 in the TLP header. The "reserved bit" may also be referred to as a "reserved bit", a "reserved bit", or the like.

It may be understood that, in a subsequent evolved version, the "reserved value" in embodiments of this application may also refer to a bit that is not used in the TLP in the corresponding evolved version. This is not limited in embodiments of this application.

The following describes terms related to embodiments of this application.

A data type may include but is not limited to an image, audio, control information, SWRITE, security, or the like.

Encapsulation parameters corresponding to a data type may be used to represent an attribute of the data type. For example, if the data type is an image, the encapsulation parameters may include but are not limited to the following four parameters:
  image data type: RAW, RGB, YUV, embedded data (embedded data), a compressed image, a target contour (object) in the image, and the like;
  pixel quantization depth: for example, 12, 20, and 24:
  resolution: for example, 1080p, 2K, and 4K; and
  segment indication information: An image sensor (sensor) outputs a row of images at a time. For images with high resolution, a TLP of a row of the images cannot be transmitted at a time, and a row of images needs to be divided into several TLPs for transmission. The segment indication information is used to indicate which segment of the current line the current TLP is.

If the data type is audio, the encapsulation parameters may include but are not limited to the following four types of parameters:
  sampling quantization format: such as floating-point quantization and integer quantization;
  sampling frequency: for example, 24 kHz and 48 kHz:
  quantization depth: for example, 8 bits or 12 bits for each sample: and
  quantity of audio channels/channels: It is used to indicate a quantity of audio channels/channels included in a current data packet.

If the data type is control information, the encapsulation parameters may include but are not limited to the following two types of parameters:
  type of the control information: for example, an inter-integrated circuit (inter-integrated circuit, I2C), a general-purpose input/output (general-purpose input/output, GPIO), and a serial peripheral interface (serial peripheral interface, SPI); and
  quantity of control information of each type: For example, a current data packet includes three I2Cs and eight GPIOs.

If the data type is security, the encapsulation parameters may include but are not limited to the following three types of parameters:
  message type: Security establishment requires a plurality of message interactions, and each interaction message is of a different type, for example, an authentication message or an encryption message;
  format indication: grouping of bits in a message and meaning of each group; and
  encrypted or not: Whether a current data packet is encrypted.

If the data type is SWRITE, the encapsulation parameter may include but is not limited to the following one parameter:
  alignment mode: 4-byte or 8-byte alignment.

The foregoing data types are merely examples for description, and, in a specific implementation, are not limited to the data types listed in embodiments of this application. The encapsulation parameters corresponding to the foregoing data types are merely examples for description. In a specific implementation, the foregoing data types may also correspond to another encapsulation parameter. This is not specifically limited herein.

It may be understood that, in embodiments of this application, the "data type" is merely an example name, and may alternatively be named another name in a specific implementation, for example, may alternatively be referred to as a data service type. Alternatively, the data type may also be referred to as A. A may be understood as the data type in embodiments of this application provided that A has a same or similar meaning as the data type in embodiments of this application. The "encapsulation parameter" is merely an example name, and may alternatively be named as another name in a specific implementation, for example, may be referred to as an attribute, or an attribute parameter, or may be referred to as B. B may be understood as the encapsulation parameter in embodiments of this application provided that B has a same or similar meaning as the encapsulation parameter in embodiments of this application.

It should be understood that, in embodiments of this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" usually represents an "or" relationship between the associated objects. "At least one of the following items (pieces)" or a similar expression thereof indicates any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

It should be understood that, in descriptions of this application, terms such as "first" and "second" are merely used for a purpose of distinguishing for description, and should not be construed as indicating or implying relative importance, nor as indicating or implying a sequence.

The following describes in detail embodiments of this application with reference to accompanying drawings.

Figure 5:
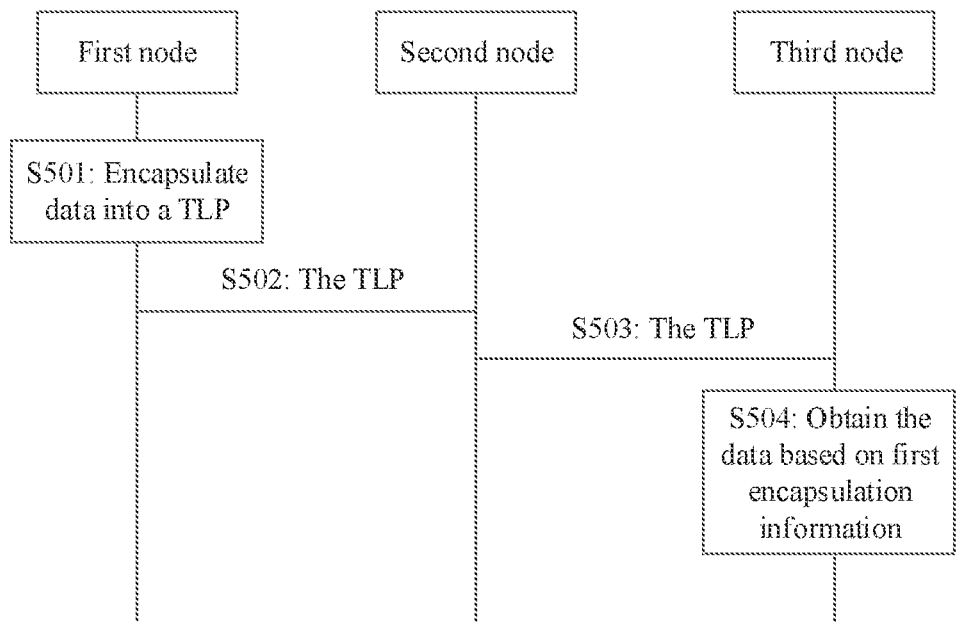
FIG. 5 is a schematic flowchart of a PCIe system-based data transmission system according to an embodiment of this application.

This application provides a PCIe-based data transmission method. The method may be applied to a PCIe system, for example, the PCIe system shown in FIG. 1 or the PCIe system shown in FIG. 2. As shown in FIG. 5, the method includes the following steps.

S501: A first node encapsulates data into a TLP, where the TLP includes a TLP header and an extension header. A first field of the TLP header, a second field of the TLP header, and the extension header are used to indicate first encapsulation information, and the first encapsulation information includes a data type of the data and at least one encapsulation parameter corresponding to the data type. The first node may be an endpoint in the PCIe system, or may be a switch in the PCIe system.

In an example description, the extension header may include 4×n bytes between the TLP header and a data payload, where n is an integer greater than or equal to 1.

In an implementation, if bits included in the extension header are not completely filled, the unused bits may be reserved.

It should be understood that the "extension header" is merely an example name, and in a subsequent evolved version, the "extension header" may also be named another name, for example, A. A may also be understood as the "extension header" in embodiments of this application provided that A can implement a function of the "extension header".

TLP may further include a data payload, and the data may be carried in a data payload part of the TLP.

Figure 6:
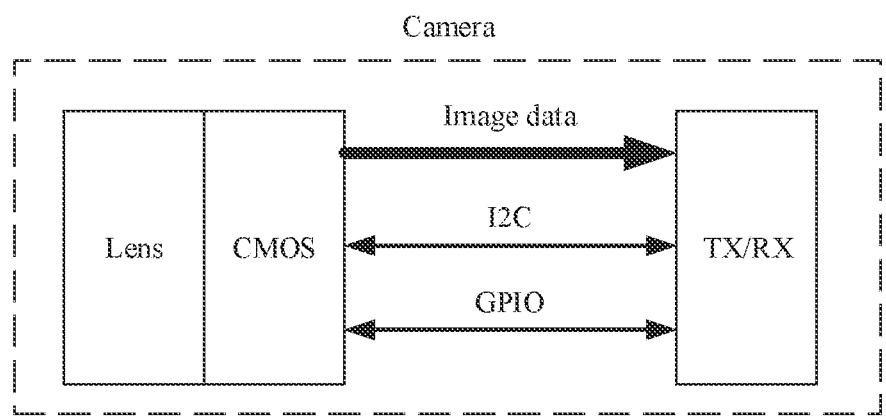
FIG. 6 is a schematic diagram of a structure of a camera according to an embodiment of this application.

In some embodiments, the first node may be an endpoint, or may be a chip in the endpoint. For example, the first node may be a transmission node (for example, TX/RX) in the endpoint. A camera (Camera) is used as an example. A structure of the camera may be shown in FIG. 6, and includes a lens (lens), a photosensitive element (complementary metal oxide semiconductor, COMS), TX/RX, and the like. The COMS is configured to collect image data by using the lens, and send the image data by using the TX/RX. The first node may be the camera, or may be the TX/RX in the camera. If the first node is the endpoint, the data to be encapsulated by the first node may be data collected by the first node. For example, if the first node is a camera, the data to be encapsulated may be image data collected by the camera, or the like. If the first node is a microphone, the data to be encapsulated may be audio data collected by the microphone, or the like. If the first node is a transmission node in the endpoint, the data to be encapsulated by the first node may be data collected by a sensor chip in the endpoint. For example, in FIG. 6, the data to be encapsulated by the first node may be the image data collected by the COMS.

In a possible implementation, before step S501, the first node may extract an encapsulation parameter of the data. For example, in FIG. 6, if the first node is the camera, the first node may determine an image data type, a pixel quantization depth, resolution, and the like of the collected image data, may calculate an amount of data of each row of images based on the image data type, the pixel quantization depth, the resolution, and the like, may obtain, with reference to a maximum data bearing capacity of each TLP in the PCIe, a quantity of TLPs required for transmitting a row of images, to determine a segmentation mode of the images, so that segment indication information can be determined based on the segmentation mode. If the first node is the TX/RX in the camera, the first node may receive the image data collected by the COMS, where the image data shows and carries encapsulation parameters such as an image data type, a pixel quantization depth, resolution, and the like. The first node may calculate an amount of data of each row of images based on the image data type, the pixel quantization depth, the resolution, and the like that are carried in the image data, may obtain, with reference to a maximum data bearing capacity of each TLP in the PCIe, a quantity of TLPs required for transmitting a row of images, to determine a segmentation mode of the images, so that segment indication information can be determined based on the segmentation mode.

For example, the first field may be a type field, and the second field may be a reserved bit. For example, the second field is a T8 field in FIG. 4. For another example, the second field is a T9 field in FIG. 4. For another example, the second field includes the T8 field and the T9 field in FIG. 4. Certainly, the first field and the second field may alternatively be other fields. This is not specifically limited herein. For ease of description, the following uses an example in which the first field is a type field and the second field is a T9 field for description.

In an example description, a reserved value of the type field and all state values of the T9 field may be used to indicate encapsulation information. For example, 13 state values 00011, 00110, 00111, 01000, 01001, 01111, 11000 to 11010 and 11100 to 11111 of the type field and two state values 0 and 1 of the T9 field are used. Therefore, a total of 2×13 state values may be used to indicate the encapsulation information.

Figure 7:
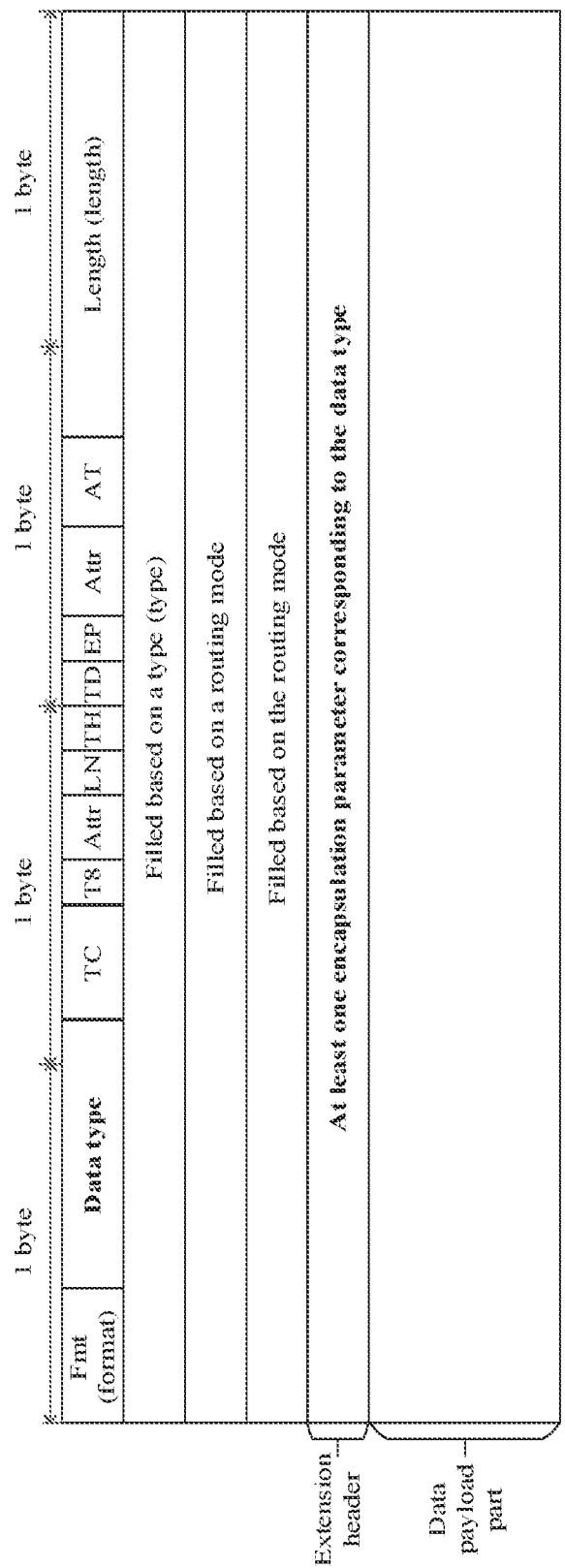
FIG. 7 is a schematic diagram for indicating first encapsulation information according to an embodiment of this application.

In an implementation, as shown in FIG. 7, when the first field of the TLP header, the second field of the TLP header, and the extension header indicate the first encapsulation information, the first field of the TLP header and the second field of the TLP header may be used to indicate the data type, and the extension header may be used to carry the encapsulation parameter in the first encapsulation information.

Figure 8:
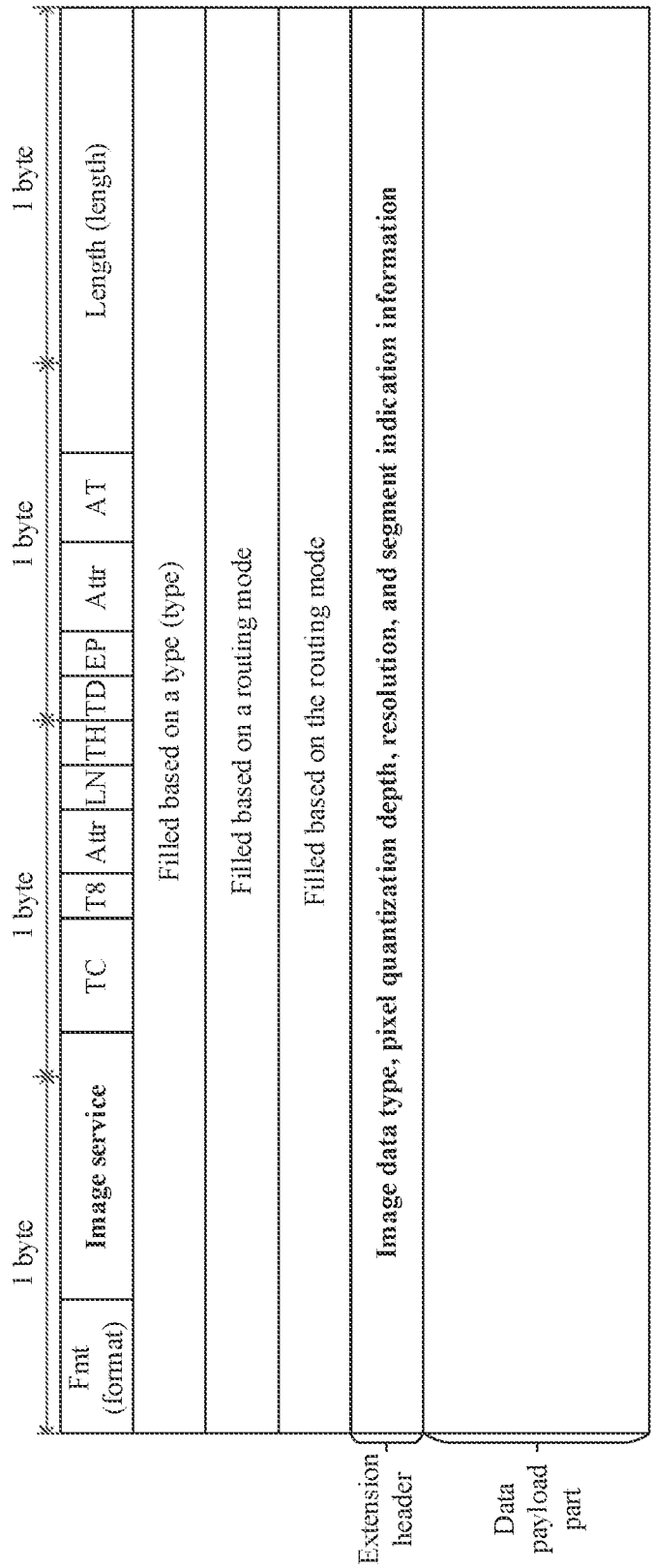
FIG. 8 is a schematic diagram of an image service according to an embodiment of this application.

In some embodiments, the type field and the T9 field may be uniformly encoded (or jointly encoded) to indicate the data type. To be specific, a value of a bit set is used to indicate the data type, and the bit set includes five bits of the type field and one bit of the T9 field, so that a state value (for example, 000010) of the six bits may be used to indicate the data type, and the extension header is used to carry the encapsulation parameter in the first encapsulation information. An image data is used as an example. The type field and the T9 field may be uniformly encoded to indicate an image service, and the extension header carries an image data type, a pixel quantization depth, resolution, and segment indication information, as shown in FIG. 8.

Figure 9:
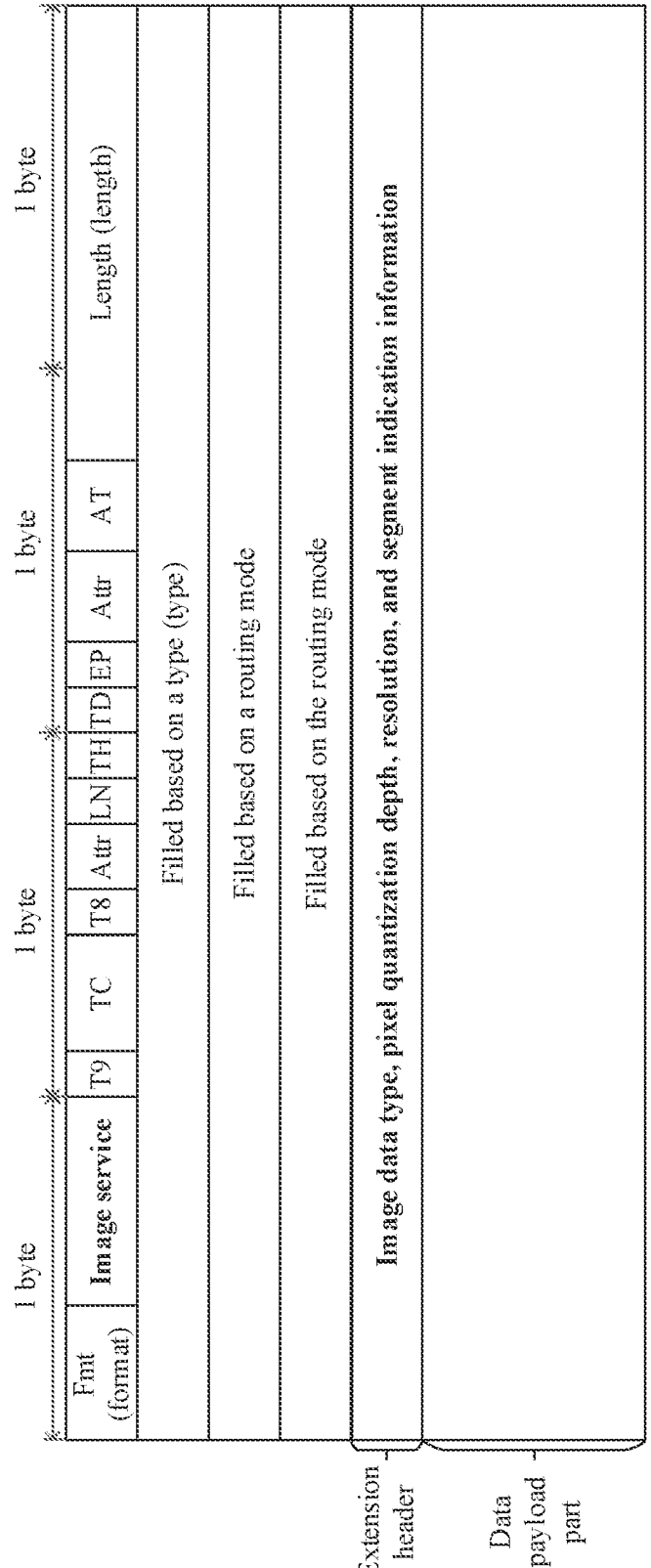
FIG. 9 is another schematic diagram of an image service according to an embodiment of this application.

In some other embodiments, a reserved value of the type field or a state value of the T9 field may be used to indicate the data type, and the extension header is used to carry the encapsulation parameter in the first encapsulation information. An image data is used as an example. A reserved value of the type field may be used to indicate an image service, and the extension header carries an image data type, a pixel quantization depth, resolution, and segment indication information, as shown in FIG. 9.

Figure 10:
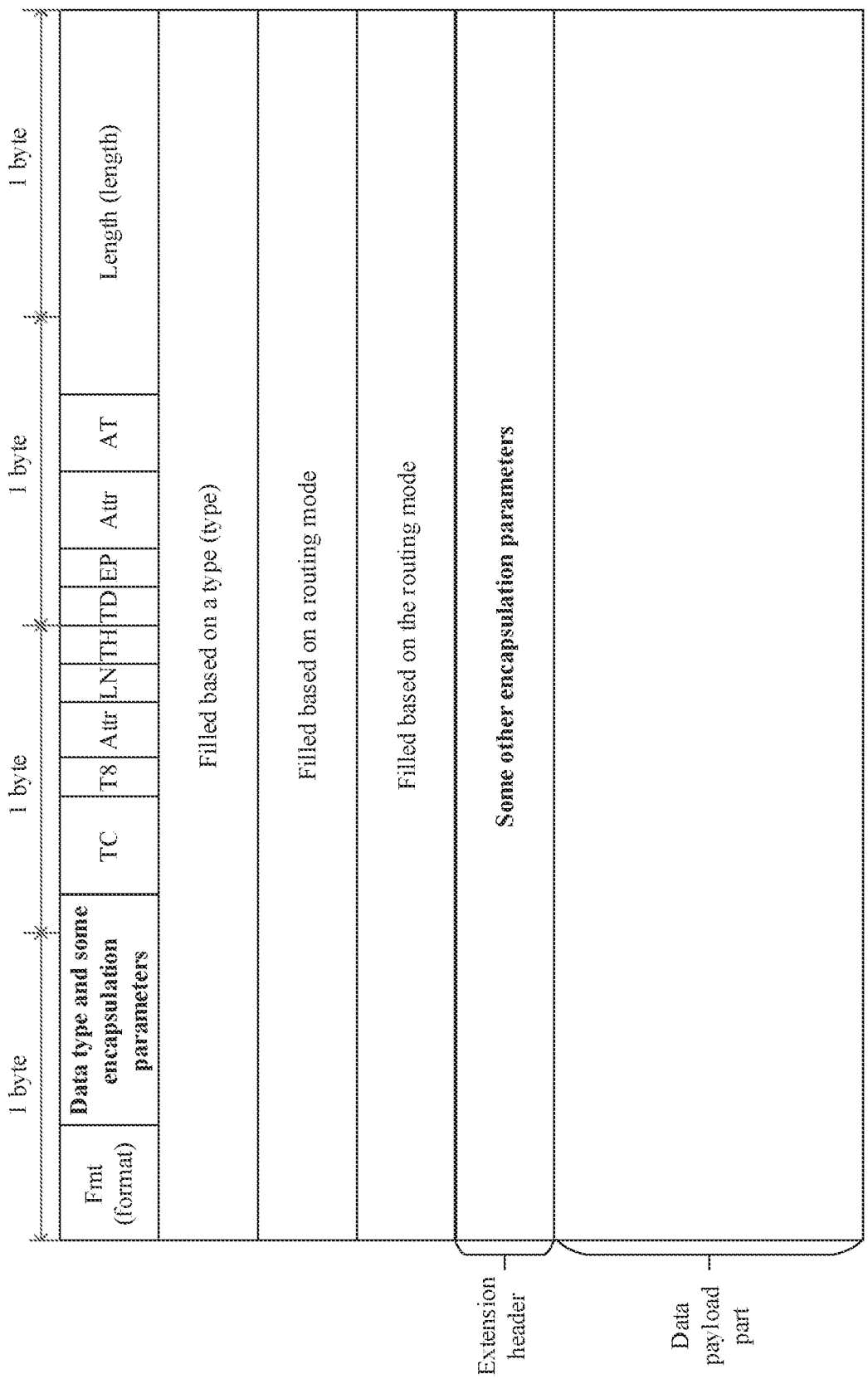
FIG. 10 is another schematic diagram for indicating first encapsulation information according to an embodiment of this application.

In another implementation, as shown in FIG. 10, when the first field of the TLP header, the second field of the TLP header, and the extension header indicate the first encapsulation information, the first field of the TLP header and the second field of the TLP header may be used to indicate the data type and some encapsulation parameters in the first encapsulation information, and the extension header may be used to carry some other encapsulation parameters in the first encapsulation information.

Figure 11:
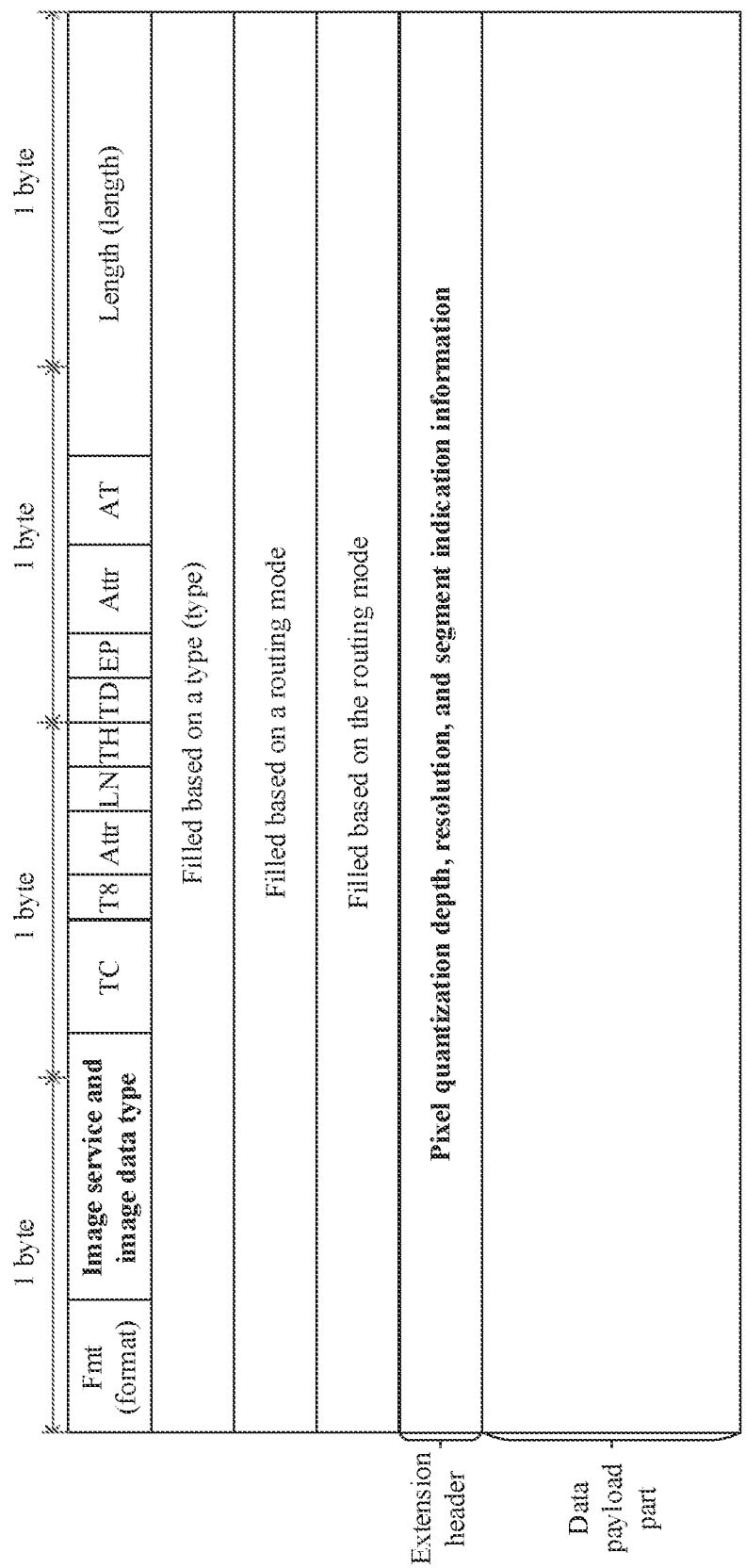
FIG. 11 is a schematic diagram of an image service according to an embodiment of this application.

In some embodiments, the type field and the T9 field may be uniformly encoded (or jointly encoded) to indicate the data type and some encapsulation parameters. To be specific, a value of a bit set is used to indicate the data type and the some encapsulation parameters in the first encapsulation information. The bit set includes five bits of the type field and one bit of the T9 field, so that a state value (for example, 000010) of the six bits may be used to indicate the data type and the some encapsulation parameters in the first encapsulation information, and the extension header is used to carry some other encapsulation parameters of the first encapsulation information. An image data is used as an example. The type field and the T9 field may be uniformly encoded to indicate an image service and an image data type, and the extension header carries a pixel quantization depth, resolution, and segment indication information, as shown in FIG. 11.

Figure 12:
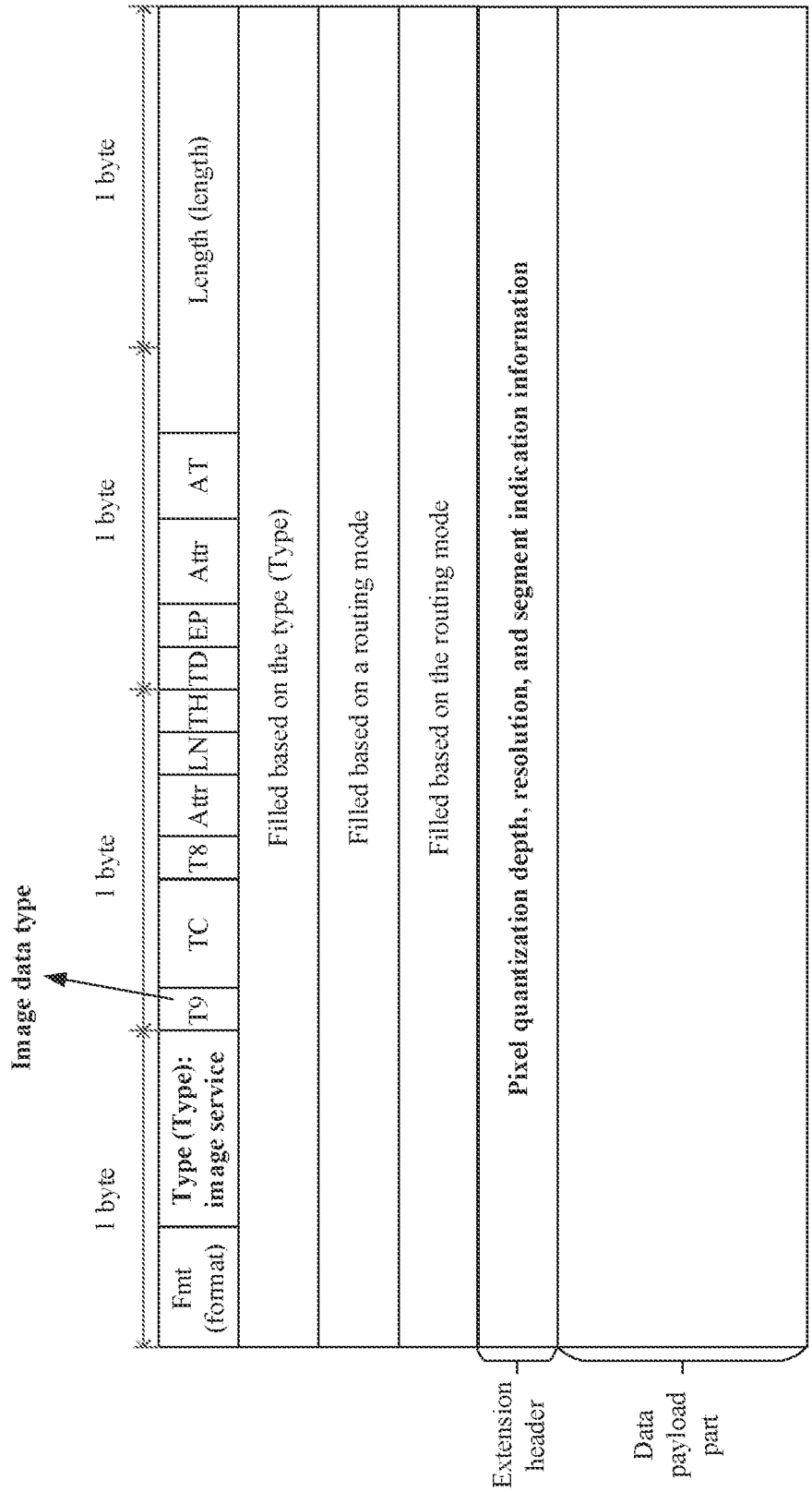
FIG. 12 is another schematic diagram of an image service according to an embodiment of this application.

In some other embodiments, a manner in which the type field and the T9 field are separately indicated may be used, or it may be understood that the type field and the T9 field indicate different content. For example, the type field may be used to indicate the data type, the T9 field may be used to indicate some encapsulation parameters in the first encapsulation information, and the extension header may be used to carry some other encapsulation parameters in the first encapsulation information. For another example, the type field may be used to indicate some encapsulation parameters in the first encapsulation information, the T9 field may be used to indicate the data type, and the extension header may be used to carry some other encapsulation parameters in the first encapsulation information. An image service is used as an example. A reserved value of the type field may be used to indicate the image service, the T9 field may be used to indicate an image data type, and the extension header carries a pixel quantization depth, resolution, and segment indication information, as shown in FIG. 12.

In an example description, the TLP may further carry indication information indicating whether the TLP is encrypted, or it may be understood that whether the TLP is encrypted is an encapsulation parameter corresponding to a data type. When the TLP indicates whether the TLP is encrypted, a type indicated by the type field may be an original PCIe type, or may be a data type in embodiments of this application.

The first encapsulation information may include all encapsulation parameters corresponding to the data type, or may include some encapsulation parameters corresponding to the data type.

In some embodiments, the TLP header may further include a third field. For example, the third field may be byte 4 to byte 15 of a 16-byte TLP header, or may be byte 4 to byte 11 of a 12-byte TLP header. The third field may carry some other encapsulation parameters corresponding to the data type. It may alternatively be understood that the third field may carry second encapsulation information, and the second encapsulation information includes another encapsulation parameter, rather than the encapsulation parameter included in the first encapsulation information, of the encapsulation parameters corresponding to the data type.

The foregoing manner may be used to indicate a format of a service of an image, audio, control information, SWRITE, and security: a plurality of formats of a service of an image, audio, control information, SWRITE, and security; a plurality of formats of a plurality of services of an image, audio, control information, SWRITE, and security; a mix (for example, an image with security protection) of a plurality of services of an image, audio, control information, SWRITE, and security; or another service type and another format. This is not listed one by one herein.

In addition, the TLP may further carry identity information of a destination node (collectively referred to as a third node below), for example, an address and an ID of the third node. The TLP may further carry identity information of the first node, for example, an address and an ID of the first node. In an example, if a length of the TLP header is 16 bytes, byte 8 to byte 15 of the TLP header may carry identity information of the first node and the third node. If a length of the TLP header is 12 bytes, byte 8 to byte 11 of the TLP header may carry identity information of the first node and the third node. The third node may be an endpoint in the PCIe system, or may be a switch in the PCIe system.

S502: The first node sends the TLP to a second node. Correspondingly, the second node receives the TLP sent by the first node. The second node may be an endpoint in the PCIe system, or may be a switch in the PCIe system. In an example description, the second node may be a switch connected to the first node in the PCIe system.

S503: The second node sends a TLP to the third node. Correspondingly, the third node receives the TLP sent by the second node.

In an implementation, the TLP sent by the second node and the TLP sent by the first node are a same TLP. To be specific, after receiving the TLP sent by the first node, the second node forwards the TLP to the third node.

In another implementation, the TLP sent by the second node and the TLP sent by the first node are different TLPs. To be specific, after receiving the TLP sent by the first node, the second node processes the TLP, for example, changes source node information of the TLP from the identity information of the first node to identity information of the second node, and then sends a processed TLP to the third node. The TLP sent by the second node includes the same data and encapsulation information as the data and the encapsulation information carried in the TLP sent by the first node. For a manner in which the TLP sent by the second node carries the data and the encapsulation information, refer to related descriptions of step S501. Details are not described herein again.

In some embodiments, before step S503, the second node may determine a routing path based on the identity information of the third node. In this way, the second node may send the TLP to the third node according to the routing path.

S504: The third node obtains the data, based on the first encapsulation information, from the TLP, sent by the second node.

Specifically, the third node decapsulates, based on the first encapsulation information, the TLP sent by the second node, to obtain the data.

In a possible implementation, the third node may obtain the data type and the encapsulation parameters corresponding to the data type from the received TLP, determine, based on the data type and the encapsulation parameters corresponding to the data type, a format of the data carried in the TLP, and decapsulate the TLP based on the format.

In an implementation, the third node may determine, based on the type field, and the reserved bit of the TLP header, and the extension header, the data type and the encapsulation parameters corresponding to the data type. For example, as shown in FIG. 8, the third node may determine, based on the type field and the T9 field of the TLP header, that the data carried in the TLP is the image service, and obtain, based on the extension header, the image data type, the pixel quantization depth, the resolution, and the segment indication information of the image data carried in the TLP.

In another implementation, the third node may determine, based on the type field, and the reserved bit of the TLP header, and the extension header, the data type and some encapsulation parameters corresponding to the data type, and determine, based on the third field of the TLP header, the remaining encapsulation parameters corresponding to the data type. For example, the third node may determine, based on the type field and the reserved bit of the TLP header, that the data carried in the TLP is an image service, obtain, based on the third field of the TLP header, the image data type of the image data carried in the TLP, and obtain, based on the extension header, the pixel quantization depth, the resolution, and the segment indication information of the image data carried in the TLP.

Figure 13:
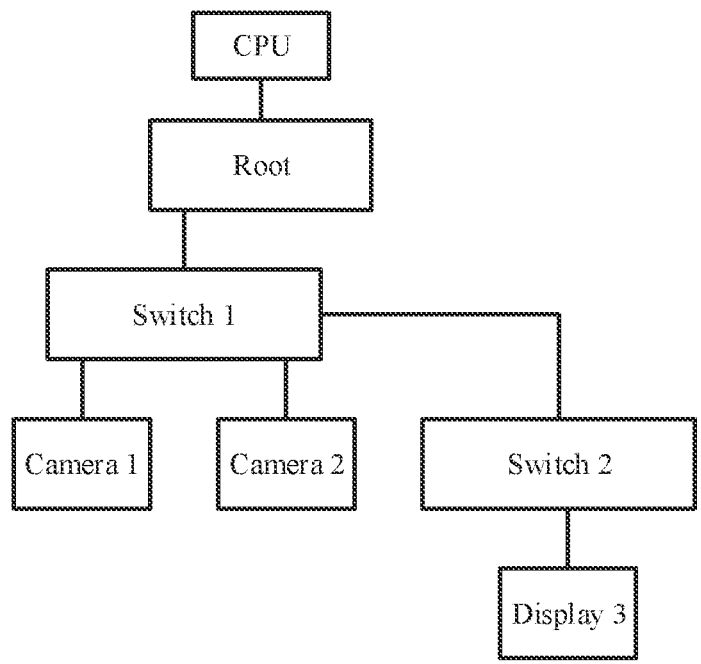
FIG. 13 is a schematic diagram of an architecture of a PCIe system according to an embodiment of this application.

To better understand the solutions provided in embodiments of this application, the following specifically describes a data transmission process with reference to a PCIe system shown in FIG. 13. As shown in FIG. 13, content shot by a camera 1 (the camera 1 is shown in FIG. 13, and other cameras are similar) or a camera 2 needs to be displayed on a display (Display). The camera 1/camera 2 may transmit data to a switch 1 and a switch 2 by using the data transmission method performed by the first node in the foregoing embodiment. The switch 1 may transmit the data to the switch 2 by using the data transmission method performed by the second node in the foregoing embodiment. The switch 2 may transmit the data to the display by using the data transmission method performed by the second node in the foregoing embodiment. The display may obtain the data by using the data transmission method performed by the third node in the foregoing embodiment. The following uses an example in which a length of a TLP header is 16 bytes and a reserved bit is a T9 field. A process in which the camera 1 transmits the data to the display is as follows:

A1: The camera 1 calculates an amount of data in each row of images based on an output image type (such as RGB and YUV), a quantity of quantized bits per pixel, and image resolution (such as 2K and 4K), determines a quantity of TLPs required for transmitting a row of images based on a maximum data bearing capacity of each TLP in a PCIe, and then determines a segmentation mode of the images.

A2: The camera 1 encapsulates the collected image data into a TLP.

For example, the camera 1 may encapsulate the data in any one of the following eight manners:

Manner 1: The camera 1 may use a state value (for example, 000010) after a type field and a T9 field of the TLP header are uniformly encoded to indicate that a data type is an image service, and use an extension header to indicate an image data type of the image data, a pixel quantization depth of the image data, resolution of the image data, and segment indication information of the image data, as shown in FIG. 8. The camera 1 fills the data into a data payload of the TLP. The camera 1 fills identity information (such as an ID and an address) of the camera 1 and identity information of the display into byte 8 to byte 15 of the TLP header.

Manner 2: The camera 1 may use a reserved value (for example, 00011) of a type field of the TLP header or a state value of the T9 field to indicate that a data type is an image service, and use an extension header to indicate an image data type of the image data, a pixel quantization depth of the image data, resolution of the image data, and segment indication information of the image data. For example, the reserved value of the type field indicates that the data type is the image service, as shown in FIG. 9. The camera 1 fills the data into a data payload of the TLP. The camera 1 fills identity information (such as an ID and an address) of the camera 1 and identity information of the display into byte 8 to byte 15 of the TLP header.

Manner 3: The camera 1 may use a state value (for example, 000010) after a type field and the T9 of the TLP header are uniformly encoded to indicate that a data type is an image service or an image data type of the image data, and use an extension header to indicate a pixel quantization depth of the image data, resolution of the image data, and segment indication information of the image data, as shown in FIG. 11. The camera 1 fills the data into a data payload of the TLP. The camera 1 fills identity information (such as an ID and an address) of the camera 1 and identity information of the display into byte 8 to byte 15 of the TLP header.

Manner 4: The camera 1 may use a reserved value (for example, 00011) of a type field of the TLP header to indicate that a data type is an image service, use the T9 field to indicate an image data type of the image data, and use an extension header to indicate a pixel quantization depth of the image data, resolution of the image data, and segment indication information of the image data, as shown in FIG. 12. The camera 1 fills the data into a data payload of the TLP. The camera 1 fills identity information (such as an ID and an address) of the camera 1 and identity information of the display into byte 8 to byte 15 of the TLP header.

Manner 5: The camera 1 may use a state value (for example, 000010) after a type field and the T9 field of the TLP header are uniformly encoded to indicate that a data type is an image service, use byte 4 to byte 15 of the TLP header to indicate an image data type of the image data, and use an extension header to indicate a pixel quantization depth of the image data, resolution of the image data, and segment indication information of the image data. The camera 1 fills the data into a data payload of the TLP. The camera 1 fills identity information (such as an ID and an address) of the camera 1 and identity information of the display into byte 8 to byte 15 of the TLP header.

Manner 6: The camera 1 may use a reserved value (for example, 00011) of a type field of the TLP header or a state value of the T9 field to indicate that a data type is an image service, use byte 4 to byte 15 of the TLP header to indicate an image data type of the image data, and use an extension header to indicate a pixel quantization depth of the image data, resolution of the image data, and segment indication information of the image data. For example, a reserved value of the type field indicates that the data type is the image service. The camera 1 fills the data into a data payload of the TLP. The camera 1 fills identity information (such as an ID and an address) of the camera 1 and identity information of the display into byte 8 to byte 15 of the TLP header.

Manner 7: The camera 1 may use a state value (for example, 000010) after a type field and the T9 of the TLP header are uniformly encoded to indicate that a data type is an image service or an image data type of the image data, use byte 4 to byte 15 of the TLP header to indicate a pixel quantization depth of the image data, and use an extension header to indicate resolution of the image data and segment indication information of the image data. The camera 1 fills the data into a data payload of the TLP. The camera 1 fills identity information (such as an ID and an address) of the camera 1 and identity information of the display into byte 8 to byte 15 of the TLP header.

Manner 8: The camera 1 may use a reserved value (for example, 00011) of a type field of the TLP header to indicate that a data type is an image service, use the T9 field to indicate an image data type of the image data, use byte 4 to byte 15 of the TLP header to indicate a pixel quantization depth of the image data, and use an extension header to indicate resolution of the image data and segment indication information of the image data. The camera 1 fills the data into a data payload of the TLP. The camera 1 fills identity information (such as an ID and an address) of the camera 1 and identity information of the display into byte 8 to byte 15 of the TLP header.

In the foregoing eight manners, the type field may use a reserved value. The following uses an example in which the type field uses the reserved value in the foregoing eight manners for description.

A3: The camera 1 sends the TLP to the switch 1.

A4: After receiving the TLP, the switch 1 detects the TLP header, parses the type field, and if the state value of the type field is a state value used in the PCI Express Base Specification Revision 5.0 Version 1.0, processes the TLP based on an original PCIe mechanism, that is, sends the TLP to a root: and then the root determines a receive node by accessing configuration space of each endpoint and sends the TLP to the receive node. If the type field is content defined in this embodiment of this application, routing information in the switch 1 is searched for based on identity information of a second node in the TLP, and the TLP is forwarded to the switch 2 based on a corresponding routing path.

A5: After receiving the data, the switch 2 detects the TLP header, parses the type field, and if the state value of the type field is a state value used in the PCI Express Base Specification Revision 5.0 Version 1.0, processes the TLP based on the original PCIe mechanism, that is, sends the TLP to the root; and then the root determines a receive node by accessing the configuration space of each endpoint and sends the TLP to the receive node. If the type field is content defined in this embodiment of this application, routing information in the switch 2 is searched for based on the identity information of a second node in the TLP, and the TLP is forwarded to the display based on a corresponding routing path.

A6: After receiving the TLP, the display parses the TLP header and the data payload to obtain a type and a format of the image, restores a complete image based on the segment indication information, and transmits the data to the display for display.

Corresponding to Manner 1 in step A2, the display may obtain the type and the format of the image in the following manner: The display parses the type field and the T9 field of the TLP header, determines, based on the 6-bit state value (for example, 000010), that the data type is the image, parses the extension header, and determines the image data type of the image data, the pixel quantization depth of the image data, the resolution of the image data, and the segment indication information of the image data.

Corresponding to Manner 2 in step A2, the display may obtain the type and the format of the image in the following manner: The display parses the type field of the TLP header, determines, based on the 5-bit state value (for example, 00011), that the data type is the image, parses the extension header, and determines the image data type of the image data, the pixel quantization depth of the image data, the resolution of the image data, and the segment indication information of the image data.

Corresponding to Manner 3 in step A2, the display may obtain the type and the format of the image in the following manner: The display parses the type field and the T9 field of the TLP header, determines, based on the 6-bit state value (for example, 000010), that the data type is the image and the image data type of the image data, parses the extension header, and determines the pixel quantization depth of the image data, the resolution of the image data, and the segment indication information of the image data.

Corresponding to Manner 4 in step A2, the display may obtain the type and the format of the image in the following manner: The display parses the type field of the TLP header, and determines, based on the 5-bit state value (for example, 00011), that the data type is the image; or the display parses the T9 field of the TLP header, determines, based on the T9 field, that the data type is the image, parses the T9 field of the TLP header, determines the image data type of the image data based on the T9 field, parses the extension header, and determines the pixel quantization depth of the image data, the resolution of the image data, and the segment indication information of the image data.

Corresponding to Manner 5 in step A2, the display may obtain the type and the format of the image in the following manner: The display parses the type field and the T9 field of the TLP header, determines, based on the 6-bit state value (for example, 000010), that the data type is the image, parses byte 8 to byte 15 of the TLP header, determines the image data type of the image data based on byte 8 to byte 15, parses the extension header, and determines the pixel quantization depth of the image data, the resolution of the image data, and the segment indication information of the image data.

Corresponding to Manner 6 in step A2, the display may obtain the type and the format of the image in the following manner: The display parses the type field of the TLP header, determines, based on the 5-bit state value (for example, 00011), that the data type is the image, parses byte 8 to byte 15 of the TP header, determines the image data type of the image data based on byte 8 to byte 15, parses the extension header, and determines the pixel quantization depth of the image data, the resolution of the image data, and the segment indication information of the image data.

Corresponding to Manner 7 in step A2, the display may obtain the type and the format of the image in the following manner: The display parses the type field and the T9 field of the TLP header, determines, based on the 6-bit state value (for example, 000010), that the data type is the image, and the image data type of the image data, parses byte 8 to byte 15 of the TLP header, determines the pixel quantization depth of the image data based on byte 8 to byte 15, parses the extension header, and determines the resolution of the image data and the segment indication information of the image data.

Corresponding to Manner 8 in step A2, the display may obtain the type and the format of the image in the following manner: The display parses the type field of the TLP header, determines, based on the 5-bit state value (for example, 00011), that the data type is the image, parses the T9 field of the TLP header, determines the image data type of the image data based on the T9 field, parses byte 8 to byte 15 of the TLP header, determines the pixel quantization depth of the image data based on byte 8 to byte 15, parses the extension header, and determines the resolution of the image data and the segment indication information of the image data.

In this embodiment of this application, the type field, the T9 field, and the extension header are used to indicate information required for transmitting the data, such as the data type and the encapsulation information corresponding to the data type, so that endpoints can communicate with each other even if the root is not used, thereby reducing complexity of an intra-vehicle network.

In addition, the reserved value of the type field is used, so that the PCIe system can be compatible with an original data transmission method of the PCIe and the data transmission method provided in embodiments of this application.

Figure 14:
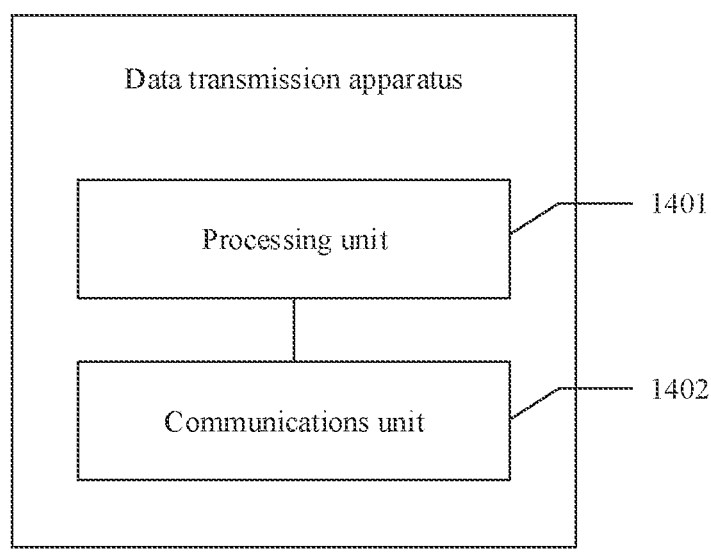
FIG. 14 is a schematic diagram of a structure of a data transmission apparatus according to an embodiment of this application.

Based on the same technical concept as the method embodiments, an embodiment of this application provides a data transmission apparatus. A structure of the apparatus may be shown in FIG. 14, and include a processing unit 1401 and a communications unit 1402.

In an implementation, the data transmission apparatus may specifically be configured to implement the method performed by the first node in embodiments in FIG. 5 to FIG. 12. The apparatus may be the first node, or a chip, a chipset, or a part of a chip in the first node, and the part of the chip is configured to perform a related method function. The processing unit 1401 is configured to encapsulate data into a TLP, where the TLP includes a packet header and an extension header, the packet header includes a first field and a second field, the first field, the second field, and the extension header are used to indicate first encapsulation information, and the first encapsulation information includes a data type of the data and at least one encapsulation parameter corresponding to the data type. The communications unit 1402 is configured to send the TLP to a second node.

In an example description, a value of a bit set indicates the data type, and the bit set includes a bit in the first field and a bit in the second field. The extension header carries the at least one encapsulation parameter.

In another example description, the first field indicates the data type, the second field indicates a first parameter set, and the extension header of the data packet carries a second parameter set.

The first parameter set includes some encapsulation parameters of the at least one encapsulation parameter, and the second parameter set includes another encapsulation parameter, except the some encapsulation parameters, of the at least one encapsulation parameter.

The first field may be a type field, and the second field is a reserved bit.

The packet header may further include a third field. The third field carries second encapsulation information, and the second encapsulation information includes another encapsulation parameter, rather than the encapsulation parameter included in the first encapsulation information, of encapsulation parameters corresponding to the data type.

In an implementation, the third field may be byte 4 to byte 15 or byte 4 to byte 11 of the packet header.

The data type may include at least one of the following: an image, audio, control information, SWRITE, and security.

For example, the first field is a reserved value.

In another implementation, the data transmission apparatus may specifically be configured to implement the method performed by the third node in embodiments in FIG. 5 to FIG. 12. The apparatus may be the third node, or a chip, a chipset, or a part of a chip in the third node, and the part of the chip is configured to perform a related method function. The communications unit 1402 is configured to receive a TLP sent by a second node, where the TLP includes a packet header and an extension header, the packet header includes a first field and a second field, the first field, the second field, and the extension header are used to indicate first encapsulation information, and the first encapsulation information includes a data type of data carried in the TLP and at least one encapsulation parameter corresponding to the data type. The processing unit 1401 is configured to obtain, from the TLP, the data based on the first encapsulation information.

In an example description, a value of a bit set indicates the data type, and the bit set includes a bit in the first field and a bit in the second field. The extension header carries the at least one encapsulation parameter.

In another example description, the first field indicates the data type, and the second field indicates a first parameter set. The extension header of the data packet carries a second parameter set. The first parameter set includes some encapsulation parameters of the at least one encapsulation parameter, and the second parameter set includes another encapsulation parameter, except the some encapsulation parameters, of the at least one encapsulation parameter.

The first field may be a type field, and the second field is a reserved bit.

The data type may include at least one of the following: an image, audio, control information, SWRITE, and security.

For example, the first field is a reserved value.

In a possible implementation, when obtaining the data based on the first encapsulation information, the processing unit 1401 is specifically configured to: determine a format of the data based on the first encapsulation information; and obtain the data based on the format.

The packet header may further include a third field. The third field carries second encapsulation information, and the second encapsulation information includes another encapsulation parameter, rather than the encapsulation parameter included in the first encapsulation information, of encapsulation parameters corresponding to the data type.

For example, the third field may be byte 4 to byte 15 or byte 4 to byte 11 of the packet header.

In a possible implementation, when obtaining the data based on the first encapsulation information, the processing unit 1401 is specifically configured to: determine a format of the data based on the first encapsulation information and the second encapsulation information; and obtain the data based on the format.

Figure 15:
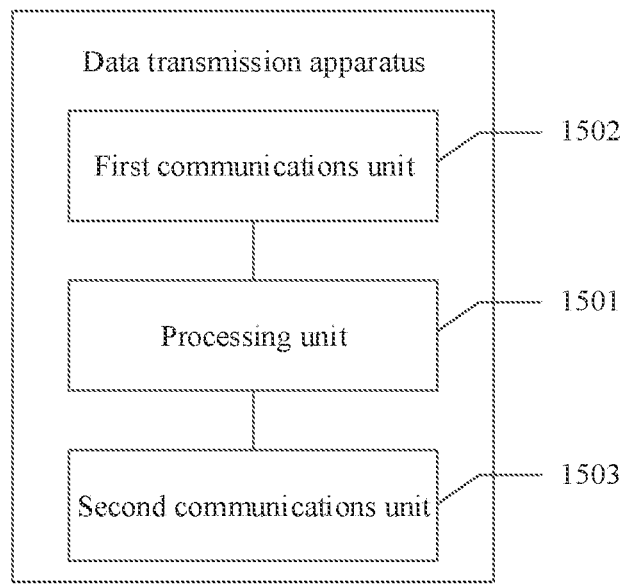
FIG. 15 is a schematic diagram of a structure of another data transmission apparatus according to an embodiment of this application.

An embodiment of this application further provides a data transmission apparatus. A structure of the apparatus may be shown in FIG. 15, and includes a processing unit 1501, a first communications unit 1502, and a second communications unit 1503. In an implementation, the data transmission apparatus may specifically be configured to implement the method performed by the second node in embodiments in FIG. 5 to FIG. 12. The apparatus may be the second node, or a chip, a chipset, or a part of a chip in the second node, and the part of the chip is configured to perform a related method function. The first communications unit 1502 is configured to transmit data with a first node. The second communications unit 1503 is configured to transmit data with a third node. The processing unit 1501 is configured to receive, by using the first communications unit 1502, a first TLP sent by the first node, and send a second TLP to the third node by using the second communications unit 1503. The TLP includes a packet header and an extension header, where a first field of the packet header, a second field of the packet header, and the extension header are used to indicate first encapsulation information, the first encapsulation information includes a data type of data carried in the TLP and at least one encapsulation parameter corresponding to the data type, and the TLP includes the first TLP and the second TLP.

In an example description, a value of a bit set indicates the data type, and the bit set includes a bit in the first field and a bit in the second field. The extension header carries the at least one encapsulation parameter.

In another example description, the first field indicates the data type, and the second field indicates a first parameter set. The extension header of the data packet carries a second parameter set. The first parameter set includes some encapsulation parameters of the at least one encapsulation parameter, and the second parameter set includes another encapsulation parameter, except the some encapsulation parameters, of the at least one encapsulation parameter.

The first field may be a type field, and the second field is a reserved bit.

The packet header may further include a third field. The third field carries second encapsulation information, and the second encapsulation information includes another encapsulation parameter, rather than the encapsulation parameter included in the first encapsulation information, of encapsulation parameters corresponding to the data type.

The third field may be byte 4 to byte 42 or byte 4 to byte 38 of the packet header.

The data type may include an image, audio, control information, SWRITE, and security.

For example, the first field may be a reserved value.

In an implementation, the first TLP carries identity information of the third node. The processing unit 1501 is further configured to, before sending the second TLP to the third node by using the second communications unit 1503, select a routing path based on the identity information of the third node. When sending the second TP to the third node by using the second communications unit 1503, the processing unit 1501 is specifically configured to send the second TLP to the third node according to the routing path.

In embodiments of this application, division into modules is an example, and is merely logical function division. In an actual implementation, there may be another division manner. In addition, functional modules in embodiments of this application may be integrated into one processor, or each of the modules may exist alone physically, or two or more modules may be integrated into one module. The integrated module may be implemented in a form of hardware, or may be implemented in a form of a software functional module. It may be understood that, for functions or implementations of the modules in embodiments of this application, further refer to related descriptions in the method embodiments.

Figure 16:
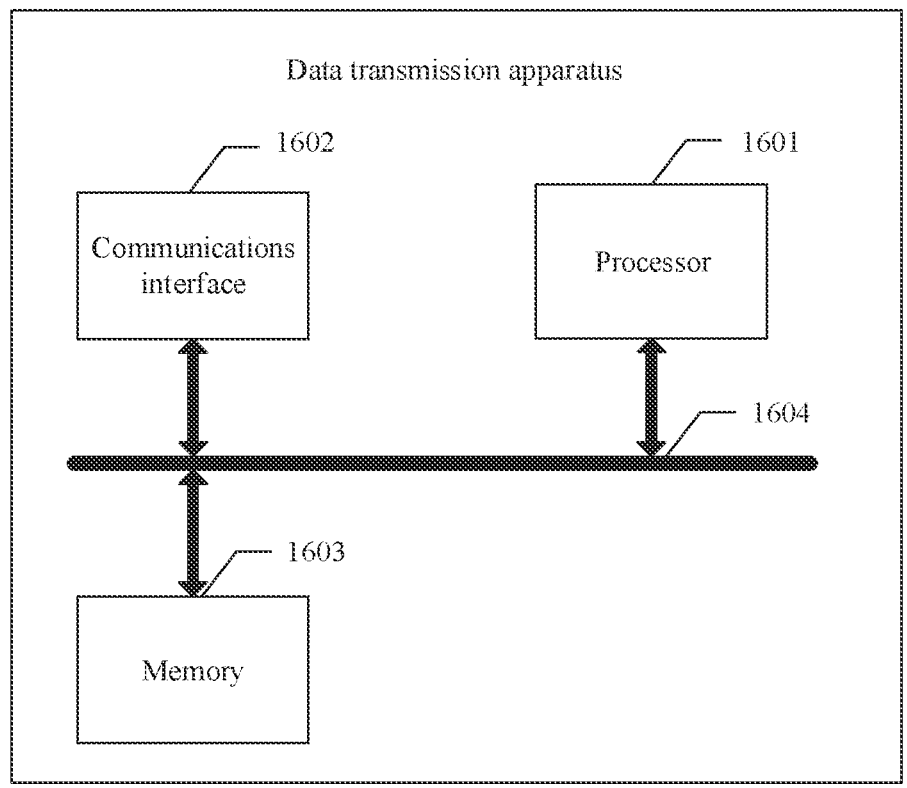
FIG. 16 is a schematic diagram of a structure of another data transmission apparatus according to an embodiment of this application.

In a possible manner, the data transmission apparatus may be shown in FIG. 16, and the apparatus may be an endpoint or a chip in an endpoint. The apparatus may include a processor 1601, a communications interface 1602, and a memory 1603. The processing unit 1401 may be the processor 1601. The communications unit 1402 may be the communications interface 1602.

The processor 1601 may be a CPU, a digital processing unit, or the like. The communications interface 1602 may be a transceiver, an interface circuit such as a transceiver circuit, a transceiver chip, or the like. The apparatus further includes a memory 1603, configured to store a program executed by the processor 1601. The memory 1603 may be a nonvolatile memory, for example, a hard disk drive (hard disk drive, HDD) or a solid-state drive (solid-state drive, SSD), or may be a volatile memory (volatile memory), for example, a random access memory (random access memory, RAM). The memory 1603 is any other medium that can be used to carry or store expected program code in a form of an instruction or a data structure and that can be accessed by a computer, but is not limited thereto.

The processor 1601 is configured to execute the program code stored in the memory 1603, and is specifically configured to perform an action of the processing unit 1401. Details are not described herein again in this application. The communications interface 1602 is specifically used to perform an action of the communications unit 1402. Details are not described herein again in this application.

In this embodiment of this application, a specific connection medium between the communications interface 1602, the processor 1601, and the memory 1603 is not limited. In this embodiment of this application, the memory 1603, the processor 1601, and the communications interface 1602 are connected through a bus 1604 in FIG. 16, and the bus is represented by a thick line in FIG. 16. A connection manner between other components is only schematically described, and is not limited thereto. The bus may be classified into an address bus, a data bus, a control bus, and the like. For ease of representation, only one thick line is used to represent the bus in FIG. 16, but this does not mean that there is only one bus or only one type of bus.

Figure 17:
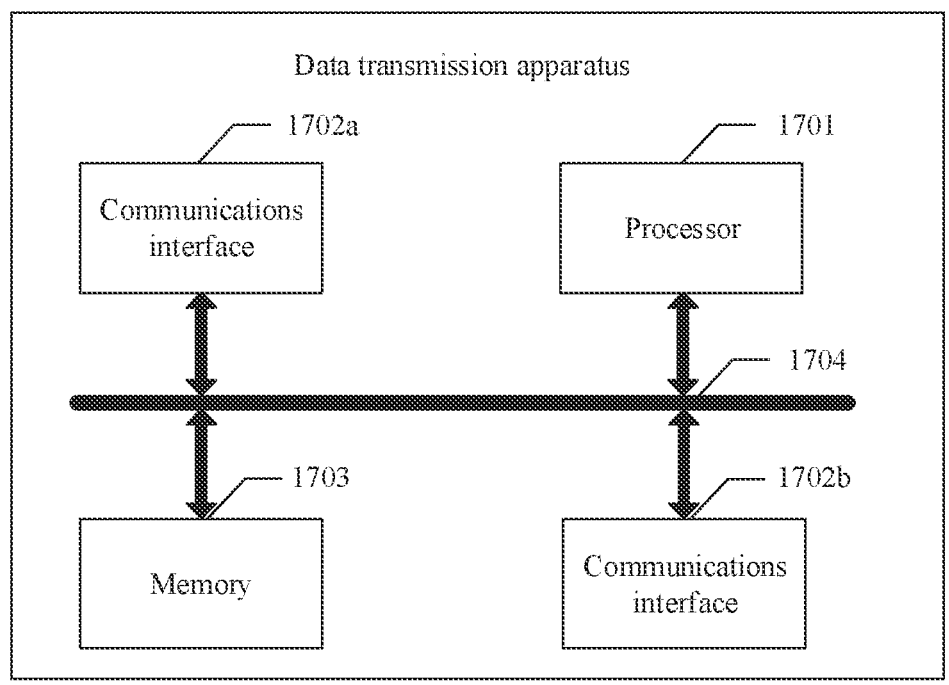
FIG. 17 is a schematic diagram of a structure of another data transmission apparatus according to an embodiment of this application.

In a possible manner, the data transmission apparatus may be shown in FIG. 17, and the apparatus may be a switch or a chip in the switch. The apparatus may include a processor 1701, a communications interface 1702a, a communications interface 1702b, and a memory 1703. The processing unit 1501 may be the processor 1701. The first communications unit 1502 may be the communications interface 1702a. The second communications unit 1503 may be the communications interface 1702b.

The processor 1701 may be a CPU, a digital processing unit, or the like. The communications interface 1702a and the communications interface 1702b each may be a transceiver, an interface circuit such as a transceiver circuit, a transceiver chip, or the like. The apparatus further includes a memory 1703, configured to store a program executed by the processor 1701. The memory 1703 may be a nonvolatile memory such as an HDD or an SS), or may be a volatile memory such as an RAM. The memory 1703 is any other medium that can be used to carry or store expected program code in a form of an instruction or a data structure and that can be accessed by a computer, but is not limited thereto.

The processor 1701 is configured to execute the program code stored in the memory 1703, and is specifically configured to perform an action of the processing unit 1501. Details are not described herein again in this application. The communications interface 1702a is specifically used to perform an action of the first communications unit 1502. Details are not described herein again in this application. The communications interface 1702b is specifically used to perform an action of the second communications unit 1503. Details are not described herein again in this application.

In this embodiment of this application, a specific connection medium between the communications interface 1702a, the communications interface 1702b, the processor 1701, and the memory 1703 is not limited. In this embodiment of this application, the memory 1703, the processor 1701, and the communications interface 1702a, the communications interface 1702b are connected through a bus 1704 in FIG. 17, and the bus is represented by a thick line in FIG. 17. A connection manner between other components is schematically described, and is not limited thereto. The bus may be classified into an address bus, a data bus, a control bus, and the like. For ease of representation, only one thick line is used to represent the bus in FIG. 17, but this does not mean that there is only one bus or only one type of bus.

An embodiment of the present application further provides a computer-readable storage medium used to store computer software instructions that need to be executed by the processor. The computer software instructions include a program that needs to be executed by the processor.

A person skilled in the art should understand that embodiments of this application may be provided as a method, a system, or a computer program product. Therefore, this application may use a form of a hardware-only embodiment, a software-only embodiment, or an embodiment with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Certainly, a person skilled in the art can make various modifications and variations to this application without departing from the protection scope of this application. In this way, this application is intended to cover these modifications and variations of this application provided that they fall within the scope of the claims of this application and their equivalent technologies.

What is claimed is:

1. A peripheral component interconnect express (PCIe)-based data transmission method, comprising:
    encapsulating, by a first node, data into a transaction layer packet (TLP), wherein the TLP comprises a packet header and an extension header, the packet header comprises a first field and a second field, wherein the first field comprises a type field and the second field comprises a T9 field, the type field and the T9 field are jointly encoded to indicate a data type of the data, and the extension header is used to indicate at least one encapsulation parameter corresponding to the data type, the data type comprises at least one of an image, audio, control information, stream write (SWRITE), or security, and the at least one encapsulation parameter represents at least one attribute of the data type; and
    sending, by the first node, the TLP to a second node.

2. The method according to claim 1, wherein a value of a bit set indicates the data type, and the bit set comprises a bit in the first field and a bit in the second field; and
    the extension header carries the at least one encapsulation parameter.

3. The method according to claim 1, wherein the second field is a reserved bit.

4. The method according to claim 1, wherein the packet header further comprises a third field, the third field carries another encapsulation parameter, other than the at least one encapsulation parameter.

5. The method according to claim 4, wherein the third field is byte 4 to byte 15 or byte 4 to byte 11 of the packet header.

6. The method according to claim 1, wherein the data type is an image, and the at least one encapsulation parameter comprises at least one of an image data type, pixel quantization depth, resolution, or segment indication information.

7. The method according to claim 1, wherein the first field is a reserved value.

8. A peripheral component interconnect express (PCIe)-based data transmission apparatus, comprising:
    a communications interface;
    at least one processor; and
    one or more memories coupled to the at least one processor and storing programming instructions for execution by the at least one processor to:
        encapsulate data into a transaction layer packet (TLP), wherein the TLP comprises a packet header and an extension header, the packet header comprises a first field and a second field, wherein the first field comprises a type field, the second field comprises a T9 field, the type field and the T9 field are jointly encoded to indicate a data type of the data, and the extension header is used to indicate at least one encapsulation parameter corresponding to the data type, the data type comprises at least one of an image, audio, control information, stream write (SWRITE), or security, and the at least one encapsulation parameter represents at least one attribute of the data type; and
    cause the communications interface to send the TLP to a second node.

9. The apparatus according to claim 8, wherein a value of a bit set indicates the data type, and the bit set comprises a bit in the first field and a bit in the second field; and
    the extension header carries the at least one encapsulation parameter.

10. The apparatus according to claim 8, wherein the second field is a reserved bit.

11. The apparatus according to claim 8, wherein the packet header further comprises a third field, the third field carries another encapsulation parameter, other than the at least one encapsulation parameter.

12. A peripheral component interconnect express (PCIe)-based data transmission apparatus, comprising:

a first communications interface, configured to transmit data with a first node;

a second communications interface, configured to transmit data with a third node;

at least one processor; and one or more memories coupled to the at least one processor and storing programming instructions for execution by the at least one processor to receive, by using the first communications interface, a first transaction layer packet (TLP) sent by the first node, and send a second TLP to the third node by using the second communications interface, wherein:

a TLP comprises a packet header and an extension header, wherein the packet header comprises a first field and a second field, the first field comprises a type field, the second field comprises a T9 field, the type field and the T9 field are jointly encoded to indicate a data type of the data, and the extension header is used to indicate at least one encapsulation parameter corresponding to the data type, the data type comprises at least one of an image, audio, control information, stream write (SWRITE), or security, the at least one encapsulation parameter represents at least one attribute of the data type, and the TLP comprises at least one of the first TLP or the second TLP.

13. The apparatus according to claim 12, wherein a value of a bit set indicates the data type, and the bit set comprises a bit in the first field and a bit in the second field; and the extension header carries the at least one encapsulation parameter.

14. The apparatus according to claim 12, wherein the first field is a type field, and the second field is a reserved bit.

15. The apparatus according to claim 12, wherein the packet header further comprises a third field, the third field carries another encapsulation parameter, other than the at least one encapsulation parameter.

16. The apparatus according to claim 12, wherein the first TLP carries identity information of the third node;

the programming instructions are further for execution by the at least one processor to:

before sending the second TLP to the third node by using the second communications interface, select a routing path based on the identity information of the third node; and when sending the second TLP to the third node by using the second communications interface, send the second TLP to the third node according to the routing path.

17. The method according to claim 1, wherein the data type is audio, and the at least one encapsulation parameter comprises at least one of a sampling quantization format, sampling frequency, quantization depth, or quantity of audio channels/channels.

* * * * *